US012666444B2

(12) United States Patent
Gao et al.

(10) Patent No.: US 12,666,444 B2
(45) Date of Patent: Jun. 23, 2026

(54) COMMUNICATION METHOD AND COMMUNICATION APPARATUS

(71) Applicant: Huawei Technologies Co., Ltd., Shenzhen (CN)

(72) Inventors: Fei Gao, Shanghai (CN); Shurong Jiao, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 18/477,857

(22) Filed: Sep. 29, 2023

(65) Prior Publication Data

US 2024/0032067 A1 Jan. 25, 2024

Related U.S. Application Data

(63) Continuation of application No. PCT/CN2022/084413, filed on Mar. 31, 2022.

(30) Foreign Application Priority Data

Apr. 2, 2021 (CN) .......................... 202110362407.9

(51) Int. Cl.
*H04W 72/232* (2023.01)
*H04W 72/0446* (2023.01)
(52) U.S. Cl.
CPC ..... *H04W 72/232* (2023.01); *H04W 72/0446* (2013.01)
(58) Field of Classification Search
None
See application file for complete search history.

(56) References Cited

U.S. PATENT DOCUMENTS

| | | | | |
|---|---|---|---|---|
| 12,368,537 | B2 * | 7/2025 | Jang | ...................... H04L 5/0053 |
| 2022/0240111 | A1 | 7/2022 | Jang et al. | |
| 2024/0313928 | A1 * | 9/2024 | Gao | ........................ H04L 1/189 |

FOREIGN PATENT DOCUMENTS

| | | |
|---|---|---|
| CN | 110536459 A | 12/2019 |
| CN | 111083791 A | 4/2020 |

(Continued)

OTHER PUBLICATIONS

3GPP TSG RAN WG1 Meeting #75, R1-135022, "Timing relationship between PDCCH and PDSCH for coverage improvement", Huawei, HiSilicon, San Francisco, USA, Nov. 11-15, 2013, total 4 pages.
3GPP TS 38.211 V16.5.0 (Mar. 2021), 3rd Generation Partnership Project; Technical Specification Group Radio Access Network; NR; Physical channels and modulation (Release 16), total 129 pages.
3GPP TSG-RAN WG1 Meeting #104-e, R1-2101447, "Enhancements on Multi-TRP for PDCCH, PUCCH and PUSCH", Qualcomm Incorporated, e-Meeting, Jan. 25-Feb. 5, 2021, total 28 pages.

(Continued)

*Primary Examiner* — Kouroush Mohebbi
(74) *Attorney, Agent, or Firm* — Conley Rose, P.C.

(57) ABSTRACT

A communication method includes that when a physical downlink control channel (PDCCH) carrying downlink control information (DCI) is a first PDCCH candidate or a second PDCCH candidate, where the first PDCCH candidate and the second PDCCH candidate correspond to a same resource, and the first PDCCH candidate and a third PDCCH candidate belong to a PDCCH candidate group configured for PDCCH repetition transmission, a reference PDCCH candidate is determined according to the PDCCH candidate group, or the second PDCCH candidate is used as a reference PDCCH, so that a network device and a terminal have a consistent understanding of the reference PDCCH candidate.

20 Claims, 11 Drawing Sheets

(56)         References Cited

FOREIGN PATENT DOCUMENTS

| CN | 111435897 | A | 7/2020 |
| CN | 112335199 | A | 2/2021 |
| JP | 2024503039 | A | 1/2024 |
| WO | 2018058485 | A1 | 4/2018 |
| WO | 2022154582 | A1 | 7/2022 |

OTHER PUBLICATIONS

3GPP TS 38.213 V16.5.0 (Mar. 2021), 3rd Generation Partnership Project; Technical Specification Group Radio Access Network; NR; Physical layer procedures for control (Release 16), total 184 pages.
3GPP TS 38.214 V16.5.0 (Mar. 2021), 3rd Generation Partnership Project; Technical Specification Group Radio Access Network; NR; Physical layer procedures for data (Release 16), total 170 pages.
3GPP TSG-RAN WG1 Meeting #104-e, R1-2101954, "Summary #3 of email discussions [104-e-NR-feMIMO-02] for mTRP PDCCH enhancements", Moderator (Qualcomm), e-Meeting, Jan. 25-Feb. 5, 2021, total 13 pages.
3GPP TSG RAN WG1 Meeting #104-e, "RAN1 Chairman's Notes", e-Meeting, Jan. 25-Feb. 5, 2021, total 158 pages.
RAN1, Further Enhancements on MIMO for NR[online], 3GPP TSG RAN #91e RP-200290, Mar. 15, 2021, total 17 pages.

* cited by examiner

Communication
system 100

Terminal device
120

Network device
110

COMMUNICATION METHOD AND COMMUNICATION APPARATUS

CROSS-REFERENCE TO RELATED APPLICATIONS

This is a continuation of International Patent Application No. PCT/CN2022/084413 filed on Mar. 31, 2022, which claims priority to Chinese Patent Application No. 202110362407.9 filed on Apr. 2, 2021. The disclosures of the aforementioned applications are herein incorporated by reference in their entireties.

TECHNICAL FIELD

This disclosure relates to the field of communication technologies, and in particular, to a communication method, a communication apparatus, and a computer storage medium.

BACKGROUND

To improve receiving performance of a physical downlink control channel (PDCCH), a PDCCH repetition transmission technology may be used, so that a network device transmits downlink control information (DCI) with same content on a plurality of PDCCH candidates.

When a PDCCH candidate used for repeatedly transmitting DCI and a PDCCH candidate used for independently transmitting DCI correspond to a same time-frequency resource, if a terminal receives one piece of DCI on the resource, the terminal may be unable to identify a specific PDCCH candidate on which the DCI is carried, thereby affecting normal communication between the terminal and the network device.

SUMMARY

According to a first aspect, an embodiment of this disclosure provides a communication method. The method may be performed by a terminal, or may be performed by a communication apparatus, for example, a chip, used for the terminal.

The method includes: receiving configuration information of a first PDCCH candidate set and a second PDCCH candidate set; receiving first DCI, where the first DCI is carried on a first PDCCH candidate in the first PDCCH candidate set, or carried on a second PDCCH candidate in the second PDCCH candidate set, the first PDCCH candidate and the second PDCCH candidate correspond to a same resource, the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set; and determining a reference PDCCH candidate according to the PDCCH candidate group, or using the second PDCCH candidate as a reference PDCCH, where a time domain location of the reference PDCCH candidate is used to determine a resource for uplink information transmission or downlink information transmission.

In a possible implementation of the first aspect, regardless of whether a network device sends the first DCI by using the first PDCCH candidate or sends the first DCI by using the second PDCCH candidate, the terminal determines the reference PDCCH candidate according to the PDCCH candidate group. This implementation does not limit a sending behavior of the network device.

In a possible implementation of the first aspect, the receiving first DCI includes: receiving the first DCI according to the configuration information of the first PDCCH candidate set, and correspondingly, the network device sends the first DCI by using the first PDCCH candidate; or receiving the first DCI according to the configuration information of the second PDCCH candidate set, and correspondingly, the network device sends the first DCI by using the second PDCCH candidate. In this implementation, it is limited that the network device can send the first DCI only through the first PDCCH candidate or through the second PDCCH candidate, to keep consistent with a terminal side on understanding of the reference PDCCH candidate.

In a possible implementation of the first aspect, the method further includes: receiving configuration information of the third PDCCH candidate set, where the first PDCCH candidate set has a linkage with the third PDCCH candidate set.

Optionally, the linkage is configured by the network device by using higher layer signaling. For example, identification information of the third PDCCH candidate set is added to the configuration information of the first PDCCH candidate set.

According to a second aspect, this disclosure provides a communication method. The method may be performed by a network device, or may be performed by a communication apparatus, for example, a chip, used for the network device.

The method includes: sending configuration information of a first PDCCH candidate set and configuration information of a second PDCCH candidate set, where the first PDCCH candidate set includes a first PDCCH candidate, the second PDCCH candidate set includes a second PDCCH candidate, the first PDCCH candidate and the second PDCCH candidate correspond to a same resource, the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set; determining a reference PDCCH candidate according to the PDCCH candidate group, or using the second PDCCH candidate as a reference PDCCH, where a time domain location of the reference PDCCH candidate is used to determine a resource for uplink information transmission or downlink information transmission; and sending first DCI, where the first DCI is carried on the first PDCCH candidate or the second PDCCH candidate.

In a possible implementation of the second aspect, the network device may send the first DCI by using any one of the first PDCCH candidate or the second PDCCH candidate. In this implementation, a sending behavior of the network device is not limited.

In a possible implementation of the second aspect, the sending first DCI includes: sending the first DCI according to the configuration information of the first PDCCH candidate set; or sending the first DCI according to the configuration information of the second PDCCH candidate set. In this implementation, the network device can send the first DCI only through the first PDCCH candidate or the second PDCCH candidate, to keep consistent with a terminal on understanding of the reference PDCCH candidate.

In a possible implementation of the first aspect or the second aspect, the first PDCCH candidate and the second PDCCH candidate have a same scrambling code sequence, and carry DCI of a same payload size. Optionally, the first PDCCH candidate and the second PDCCH candidate further correspond to a same control resource set (CORESET). In this implementation, the first PDCCH candidate and the second PDCCH candidate meet a condition of being counted as one PDCCH candidate to be monitored.

In a possible implementation of the first aspect or the second aspect, the PDCCH candidate group includes one or more pairs of PDCCH candidates, each pair of PDCCH candidates is used to transmit same DCI, and the first PDCCH candidate and the third PDCCH candidate belong to a pair of PDCCH candidates.

Optionally, the determining a reference PDCCH candidate according to the PDCCH candidate group includes: using the first PDCCH candidate as the reference PDCCH candidate, or using the third PDCCH candidate as the reference PDCCH candidate.

In a possible implementation of the first aspect or the second aspect, a time domain location of the first PDCCH candidate is earlier than a time domain location of the second PDCCH candidate, and when the reference PDCCH candidate is used to determine a time domain location of a physical downlink shared channel (PDSCH), the reference PDCCH candidate is the first PDCCH candidate.

In a possible implementation of the first aspect or the second aspect, a time domain location of the first PDCCH candidate is earlier than a time domain location of the second PDCCH candidate, and when the reference PDCCH candidate is used to determine a counter downlink assignment indicator (C-DAI) or a total downlink assignment indicator (T-DAI), the reference PDCCH candidate is the first PDCCH candidate.

By using the communication method provided in the first aspect or the second aspect, the reference PDCCH candidate is determined according to the PDCCH candidate group or the second PDCCH candidate. This resolves a problem that the terminal cannot distinguish, on an overlapped resource, whether a monitored PDCCH is an independently transmitted PDCCH or a repeatedly transmitted PDCCH, so that the terminal and the network device have a consistent understanding of a manner of determining a reference point related to the PDCCH monitored on the overlapped resource, thereby improving communication reliability.

According to a third aspect, this disclosure provides a communication method. The method may be performed by a terminal, or may be performed by a communication apparatus, for example, a chip, used for the terminal.

The method includes: receiving configuration information of a first PDCCH candidate set and configuration information of a second PDCCH candidate set, where a resource corresponding to the first PDCCH candidate set overlaps a resource corresponding to the second PDCCH candidate set, the first PDCCH candidate set includes a first PDCCH candidate, the first PDCCH candidate belongs to a PDCCH candidate group, and the first PDCCH candidate and a third PDCCH candidate that is in the PDCCH candidate group are used to transmit same DCI; the second PDCCH candidate set includes a second PDCCH candidate, the first PDCCH candidate and the second PDCCH candidate are located on an overlapped resource, and the third PDCCH candidate belongs to a third PDCCH candidate set; and monitoring a PDCCH candidate on a resource that is in the first PDCCH candidate set and that does not overlap the resource of the second PDCCH candidate set; and monitoring a PDCCH candidate on a resource that is in the second PDCCH candidate set and that does not overlap the resources of the first PDCCH candidate set.

According to a fourth aspect, this disclosure provides a communication method. The method may be performed by a network device, or may be performed by a communication apparatus, for example, a chip, used for the network device.

The method includes: sending configuration information of a first PDCCH candidate set and configuration information of a second PDCCH candidate set, where a resource corresponding to the first PDCCH candidate set overlaps a resource corresponding to the second PDCCH candidate set, the first PDCCH candidate set includes a first PDCCH candidate, the first PDCCH candidate belongs to a PDCCH candidate group, the first PDCCH candidate and a third PDCCH candidate that is in the PDCCH candidate group are used to transmit same DCI; the second PDCCH candidate set includes a second PDCCH candidate, the first PDCCH candidate and the second PDCCH candidate are located on an overlapped resource, and the third PDCCH candidate belongs to a third PDCCH candidate set; and sending first DCI, where the first DCI is carried on a PDCCH candidate on a resource that is in the first PDCCH candidate set and that does not overlap the resource of the second PDCCH candidate set, or the first DCI is carried on a PDCCH candidate on a resource that is in the second PDCCH candidate set and that does not overlap the resource of the first PDCCH candidate set.

In a possible implementation of the third aspect or the fourth aspect, that a resource corresponding to the first PDCCH candidate set overlaps a resource corresponding to the second PDCCH candidate set includes: time domain resources corresponding to the first PDCCH candidate set and the second PDCCH candidate set fully overlap, and frequency domain resources corresponding to the first PDCCH candidate set and the second PDCCH candidate set partially overlap; or time domain resources corresponding to the first PDCCH candidate set and the second PDCCH candidate set partially overlap, and frequency domain resources corresponding to the first PDCCH candidate set and the second PDCCH candidate set partially overlap or fully overlap.

In a possible implementation of the third aspect or the fourth aspect, the first PDCCH candidate set and the second PDCCH candidate set correspond to DCI of a same payload size, the first PDCCH candidate set and the second PDCCH candidate set correspond to a same scrambling code, or the first PDCCH candidate set and the second PDCCH candidate set correspond to DCI of a same format.

In a possible implementation of the third aspect or the fourth aspect, the first PDCCH candidate and the second PDCCH candidate correspond to a same resource, have a same scrambling code sequence, and carry DCI of a same payload size. Optionally, the first PDCCH candidate and the second PDCCH candidate further correspond to a same CORESET. In this implementation, the first PDCCH candidate and the second PDCCH candidate meet a condition of being counted as one PDCCH candidate to be monitored.

By using the communication method provided in the third aspect or the fourth aspect, the terminal does not monitor a PDCCH candidate on an overlapped resource. This resolves a problem that the terminal cannot distinguish, on an overlapped resource, whether a monitored PDCCH is an individually transmitted PDCCH or a repeatedly transmitted PDCCH, so that the network device and the terminal have a consistent understanding of a manner of determining a reference point related to the PDCCH monitored on the overlapped resource, thereby improving communication reliability.

According to a fifth aspect, an embodiment of this disclosure provides a communication method. The method may be performed by a terminal, or may be performed by a communication apparatus, for example, a chip, used for the terminal.

The method includes: receiving configuration information of a first PDCCH candidate set and a second PDCCH candidate set; receiving first DCI, where the first DCI includes a first indicator, the first indicator indicates that the first DCI is carried on a first PDCCH candidate in the first PDCCH candidate set, or is carried on a second PDCCH candidate in the second PDCCH candidate set, the first PDCCH candidate and the second PDCCH candidate correspond to a same resource, the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set; and determining a reference PDCCH candidate according to the first DCI.

According to a sixth aspect, this disclosure provides a communication method. The method may be performed by a network device, or may be performed by a communication apparatus, for example, a chip, used for the network device.

The method includes: sending configuration information of a first PDCCH candidate set and configuration information of a second PDCCH candidate set; sending first DCI, where the first DCI includes a first indicator, the first indicator indicates that the first DCI is carried on a first PDCCH candidate in the first PDCCH candidate set, or is carried on a second PDCCH candidate in the second PDCCH candidate set, the first PDCCH candidate and the second PDCCH candidate correspond to a same resource, the first PDCCH candidate belongs to a PDCCH candidate group, and the first PDCCH candidate and a third PDCCH candidate that is in the PDCCH candidate group are used to transmit same DCI, and the third PDCCH candidate belongs to a third PDCCH candidate set.

By using the communication method provided in the fifth aspect or the sixth aspect, downlink control information includes indication information to explicitly notify the terminal that a repeatedly transmitted PDCCH or an independently transmitted PDCCH is sent on an overlapped resource, so that the terminal and the network device have a consistent understanding of the PDCCH monitored on the overlapped resource, thereby improving communication reliability.

According to a seventh aspect, this disclosure further provides a communication apparatus, including a unit, a module, or a means configured to perform the steps in the first aspect, the third aspect, or the fifth aspect.

According to an eighth aspect, this disclosure further provides a communication apparatus, including a unit, a module, or a means configured to perform the steps in the second aspect, the fourth aspect, or the sixth aspect.

According to a ninth aspect, this disclosure further provides a communication apparatus, including a processor and an interface circuit. The processor is configured to communicate with another apparatus through the interface circuit, and perform the method provided in the first aspect, the third aspect, or the fifth aspect. There may be one or more processors.

According to a tenth aspect, this disclosure further provides a communication apparatus, including a processor and an interface circuit. The processor is configured to communicate with another apparatus through the interface circuit, and perform the method provided in the second aspect, the fourth aspect, or the sixth aspect. There may be one or more processors.

According to an eleventh aspect, this disclosure further provides a communication apparatus, including a processor. The processor configured to invoke a program stored in a memory, to perform the method provided in the first aspect, the third aspect, or the fifth aspect. The memory may be located inside or outside the apparatus. In addition, there may be one or more processors.

According to a twelfth aspect, this disclosure further provides a communication apparatus, including a processor. The processor configured to invoke a program stored in a memory, to perform the method provided in the second aspect, the fourth aspect, or the sixth aspect. The memory may be located inside or outside the apparatus. In addition, there may be one or more processors.

According to a thirteenth aspect, this disclosure further provides a computer program. When the program is invoked by a processor, the method provided in the first aspect, the third aspect, or the fifth aspect is performed.

According to a fourteenth aspect, this disclosure further provides a computer program. When the program is invoked by a processor, the method provided in the second aspect, the fourth aspect, or the sixth aspect is performed.

In addition, a computer-readable storage medium is provided, including the computer program provided in the thirteenth aspect or the fourteenth aspect.

DESCRIPTION OF EMBODIMENTS

Figure 1:
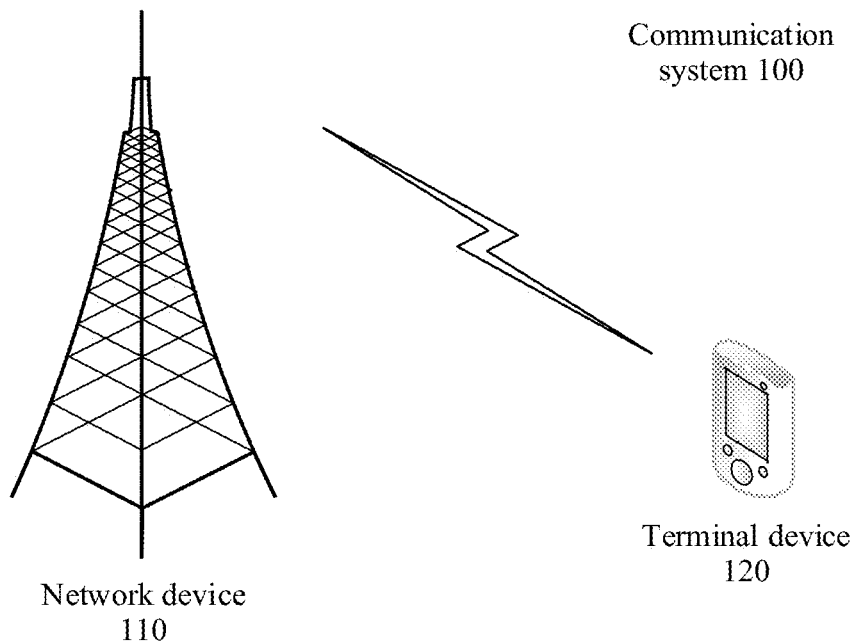
FIG. 1 is a schematic diagram of a communication system 100 according to an embodiment of this disclosure.

FIG. 1 is a schematic diagram of a communication system 100 according to an embodiment of this disclosure.

As shown in FIG. 1, the communication system 100 includes a network device 110 and a terminal 120. The terminal 120 communicates with the network device 110 through electromagnetic waves. When the terminal 120 sends information, a wireless communication module of the terminal 120 may obtain information bits that are sent, by using a radio channel, to the network device 110. For example, the information bits are information bits that are generated by a processing module of the terminal, received from another device, or stored in a storage module of the terminal. The terminal 120 may be used as an entity for sending uplink data to send an uplink channel to the network device 110. The uplink channel may carry the uplink data. The terminal 120 may also receive downlink data directly sent by the network device 110 or forwarded by the network device 110 by using a network node such as a relay device.

It should be understood that FIG. 1 shows an example of one network device and one terminal. Optionally, the communication system 100 may include a plurality of network devices, and another quantity of terminals may be included in a coverage area of each network device. This is not limited in this embodiment of this disclosure.

In addition to point-to-point transmission between the network device and the terminal shown in FIG. 1, this embodiment of this disclosure is further applicable to scenarios such as multi-hop/relay transmission between a network device and a terminal, dual connectivity (DC) or multi-connectivity between a plurality of network devices and a terminal. This is not particularly limited in this disclosure.

In this disclosure, the terminal 120 may be a device of various types that provides a user with voice and/or data connectivity, for example, the terminal 120 may be a handheld device with a wireless connection function, or a processing device connected to a wireless modem. The terminal 120 may communicate with a core network through an access network, such as a radio access network (RAN), and exchange voice and/or data with the RAN. The terminal 120 may also be referred to as a terminal, user equipment (UE), a mobile station, a mobile device, a remote station, an access point (AP), a remote terminal, an access terminal, a user terminal, a user device, or the like. For example, the terminal 120 may be a mobile phone (or referred to as a "cellular" phone), a computer with a mobile terminal, a portable, pocket-sized, handheld, computer built-in, or vehicle-mounted mobile apparatus, an intelligent wearable device, an unmanned aerial vehicle device, or the like. In this embodiment of this disclosure, chips used in the foregoing devices may also be referred to as terminals.

In this disclosure, the network device 110 may be an access network device, and the access network device may be configured to connect the terminal 120 to an access network such as a RAN. The network device 110 may be a base station defined by the 3rd Generation Partnership Project (3GPP). For example, the network device 110 may be a base station device in a Long-Term Evolution (LTE) system, namely, an evolved NodeB (eNB/eNodeB), may be a device on an access network side in a 5G New Radio (NR) system, including a gNB and a transmission reception point (TRP), or may be a central unit (CU) or a distributed unit (DU), where the CU may also be referred to as a control unit, protocol layers of the base station are split by using a CU-DU structure, some functions of the protocol layers are centrally controlled by the CU, some or all functions of the protocol layers are distributed in the DU, and the CU centrally controls the DUs. In addition, when an eNB is connected to a 5G core network (5GCN), the LTE eNB may also be referred to as an eLTE eNB. The eLTE eNB is an LTE base station device evolved according to the LTE eNB, and may be directly connected to the 5GCN. The eLTE eNB also belongs to a base station device in NR. Alternatively, the network device 110 may be an AP, an access controller (AC), or another network device that has a capability of communicating with a terminal and a core network, for example, a relay device, an in-vehicle device, an intelligent wearable device, or the like. A type of the network device is not limited in this embodiment of this disclosure.

The following describes technologies related to the PDCCH.

Figure 2:
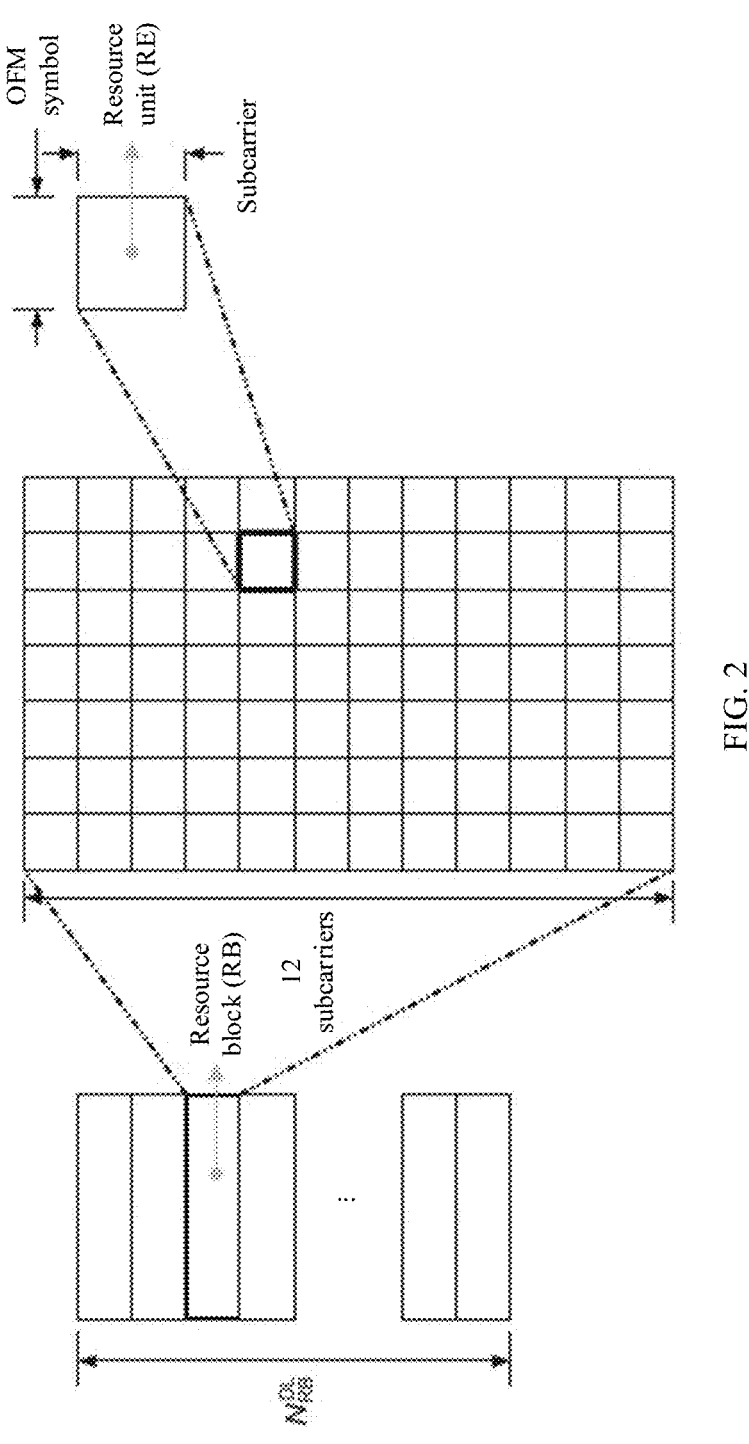
FIG. 2 is a schematic diagram of a downlink time-frequency resource according to an embodiment of this disclosure.

An NR system is used as an example. The NR system is divided into individual subcarriers in a frequency domain, and a subcarrier spacing (SCS) may be determined according to a subcarrier spacing configuration $\mu$. For example, when $\mu=0$, the subcarrier spacing is 15 kiloHertz (kHz); or when $\mu=1$, the subcarrier spacing is 30 kHz. A unit of an uplink or downlink frequency domain resource may be a resource block (RB), and each RB includes 12 consecutive subcarriers in the frequency domain. FIG. 2 shows a downlink time-frequency resource grid. As shown in FIG. 2, $N_{RB}$ indicates a quantity of RBs in one downlink scheduling. Each element in the resource grid is referred to as a resource element (RE), and an RE is a minimum physical resource and corresponds to one subcarrier in one symbol. An uplink time-frequency resource grid is similar to the downlink time-frequency resource grid. In the NR system, one slot includes 12 or 14 symbols in time, and each symbol may be indicated by one index. The symbols presented in this disclosure refer to orthogonal frequency-division multiplexing (OFDM) symbols.

A CORESET is used to send a PDCCH, the PDCCH is sent in a range of the CORESET, and a part of or all of time-frequency resources in the CORESET are used. The CORESET may be understood as a time-frequency resource set. One CORESET includes search space at different aggregation levels, may include a plurality of consecutive or non-consecutive RBs in the frequency domain, and may include one or more consecutive symbols in a time domain, and these symbols may be located at any location in a slot. The CORESET may be configured by higher layer signaling, such as Radio Resource Control (RRC) signaling.

A control channel element (CCE) is a basic resource unit carrying a PDCCH, and a resource carrying a PDCCH includes one or more CCEs. Each CCE in the CORESET corresponds to an index number. A given PDCCH may be carried by 1, 2, 4, 8, or 16 CCEs, and a quantity of CCEs carrying a PDCCH may be determined according to a DCI payload size and a required coding rate. The quantity of CCEs carrying the PDCCH is also referred to as an aggregation level (AL). A device on the network side may adjust the aggregation level of the PDCCH according to a status of an actually transmitted radio channel, to implement adaptive link transmission. One CCE is formed by six resource element groups (REG). One REG occupies one OFDM symbol in the time domain and one RB in the frequency domain.

DCI is transmitted through the PDCCH, or the PDCCH carries the DCI. The DCI may indicate downlink allocation information, for example, a modulation and coding scheme, resource allocation, and hybrid automatic repeat request (HARQ) information related to a downlink shared channel. The DCI may further indicate uplink scheduling grant information, for example, a modulation and coding scheme, resource allocation, and HARQ information related to an uplink shared channel.

Search space is a set of PDCCH candidates at an aggregation level. A PDCCH candidate may be considered as a time-frequency location at which a PDCCH may appear, and each PDCCH candidate has a corresponding time-frequency resource. A network device may select one or more PDCCH candidates to send DCI, or may be understood as sending a PDCCH. The network device may configure one search space or a plurality of search space at different aggregation levels for a terminal by using higher layer signaling. These search space may be referred to as a search space set (SS set). In other words, one search space set may include one search space or a plurality of search space at different aggregation levels. Because the terminal does not know in advance a specific PDCCH candidate or specific PDCCH candidates on which the DCI is sent by the network device, but the terminal knows locations of these PDCCH candidates according to configuration information, the terminal monitors PDCCH candidates in the search space, including detecting and attempting to decode all PDCCH candidates in the search space. If cyclic redundancy check (CRC) succeeds, it is considered that the terminal receives a PDCCH sent by the network device, and obtains the DCI carried on the PDCCH. In this case, the terminal may continue to perform a subsequent uplink and downlink data transmission process according to the DCI carried by the PDCCH. The foregoing behavior that the terminal attempts to perform decoding on each PDCCH candidate to determine whether the corresponding DCI is received may also be referred to as blind detection (BD). A duration for the terminal to perform PDCCH blind detection on a search space set may be referred to as a PDCCH monitoring occasion (PDCCH MO). One PDCCH MO may be included in one slot or one time span. One PDCCH MO may be jointly determined by using a monitoring start symbol of one search space set and a CORESET bound to the monitored search space set. For example, a monitoring start symbol of one search space set monitored by a terminal side device is a first symbol in one slot, and the search space set is bound to one CORESET with a length of three symbols. Therefore, a PDCCH MO for monitoring the search space set is the first three symbols, namely, the first symbol, the second symbol, and the third symbol, in the slot in which the PDCCH MO is located. A quantity of slots required for a PDCCH MO may be referred to as a monitoring period. Optionally, a minimum unit of the monitoring period is one slot.

"Monitoring" described in this disclosure may also be understood as "attempting to decode", "monitoring a PDCCH" may also be understood as "attempting to decode a PDCCH", and "detecting a PDCCH" may be understood as "successfully decoding a PDCCH". In addition, a meaning of "monitoring a PDCCH" described in this disclosure is the same as a meaning of "monitoring a PDCCH candidate". Details are not described below again.

To improve PDCCH receiving performance, a network device may repeatedly send a PDCCH. There are a plurality of manners for repeatedly sending a PDCCH. A plurality of PDCCHs carrying same DCI may be sent at different times, at different frequencies, or by using different beams, or a plurality of PDCCHs carrying same DCI may be simultaneously sent to one terminal by using a plurality of transmission points. For example, that a PDCCH is repeatedly sent twice means that same DCI is repeatedly sent twice. Repetition transmission of a PDCCH may be defined as follows: a plurality of PDCCHs transmit same DCI by using a same AL, and encoded bits carried in the plurality of PDCCHs are also the same. In this disclosure, "repeated sending of a PDCCH" is also referred to as "PDCCH repetition" or "PDCCH repetition transmission", and "PDCCH used to repeatedly transmit DCI" may also be referred to as "repeatedly transmitted PDCCH". Corresponding to repetition transmission of the PDCCH, there is also a PDCCH for individually transmitting DCI, or a PDCCH for separately transmitting DCI. In other words, a PDCCH carrying specific DCI is sent by the network device to the terminal only once when initial data transmission is scheduled. In this disclosure, "a PDCCH for individually transmitting DCI" may also be referred to as an "individual PDCCH" or "individually transmitted PDCCH", a PDCCH candidate that may be used as an individual PDCCH may be referred to as an "individual PDCCH candidate" or "PDCCH candidate for individually transmitting DCI", and an SS set including the individual PDCCH candidate may be referred to as an individual SS set. The individual PDCCH does not need to be repeatedly transmitted or softly combined along with other PDCCHs.

It may be defined that all PDCCH candidates in one search space set are used for PDCCH repetition transmission and are not used as individual PDCCHs. A linkage may be configured for different search space sets for PDCCH repetition transmission. The linkage may be indicated by the network device to the terminal by using indication information. For example, an identifier of another associated search space set is added to configuration information of one search space set. A linkage between two search space sets means that a PDCCH candidate in one search space set is in a one-to-one correspondence with a PDCCH candidate in the other search space set and is used for PDCCH repetition transmission. A PDCCH candidate in one search space set may be linked with a corresponding PDCCH candidate in another search space set, and is used to transmit same DCI. The corresponding PDCCH candidates may be PDCCH candidates in search space at a same aggregation level in different search space sets. Optionally, sequence numbers of the corresponding PDCCH candidates are the same, or there is another preset linkage between the sequence numbers of the corresponding PDCCH candidates. For example, there is a predefined offset between the sequence numbers of the PDCCH candidates. In addition, in this disclosure, an associated PDCCH candidate used for PDCCH repetition transmission is referred to as a linked PDCCH candidate, and a search space set including the linked PDCCH candidate used for PDCCH repetition transmission is referred to as a linked SS set.

For example, two linked PDCCH candidates may be used for PDCCH repetition transmission. The two PDCCH candidates may be referred to as a linked PDCCH candidate pair or a pair of linked PDCCH candidates. The search space sets to which the two PDCCH candidates respectively belong may be referred to as a linked search space set pair or a pair of linked search space sets. A quantity of PDCCH candidates included in each of a pair of linked SS sets is the same, and the PDCCH candidates are in a one-to-one correspondence. A pair of linked SS sets may include one or more pairs of linked PDCCH candidates, each pair of linked PDCCH candidates is used to transmit one DCI, and DCI transmitted by different pairs of linked PDCCH candidates may be the same or may be different. For example, a network device selects a pair of linked PDCCH candidates to transmit DCI #1 and selects another pair of linked PDCCH candidates to transmit DCI #2. For another example, in a process of transmitting DCI #1 for the first time, a network device selects a pair of linked PDCCH candidates to transmit the DCI #1, and in a process of transmitting the DCI #1 for the second time, the network device selects another pair of linked PDCCH candidates to transmit the DCI #1. It may be understood that, a quantity of PDCCH candidates used for repeatedly transmitting DCI is not limited in this disclosure, and a quantity of linked PDCCH candidates is not limited to only two. There may be more than two linked PDCCH candidates used for transmitting same DCI. Correspondingly, the more than two linked PDCCH candidates respectively belong to more than two linked SS sets.

Figure 3:
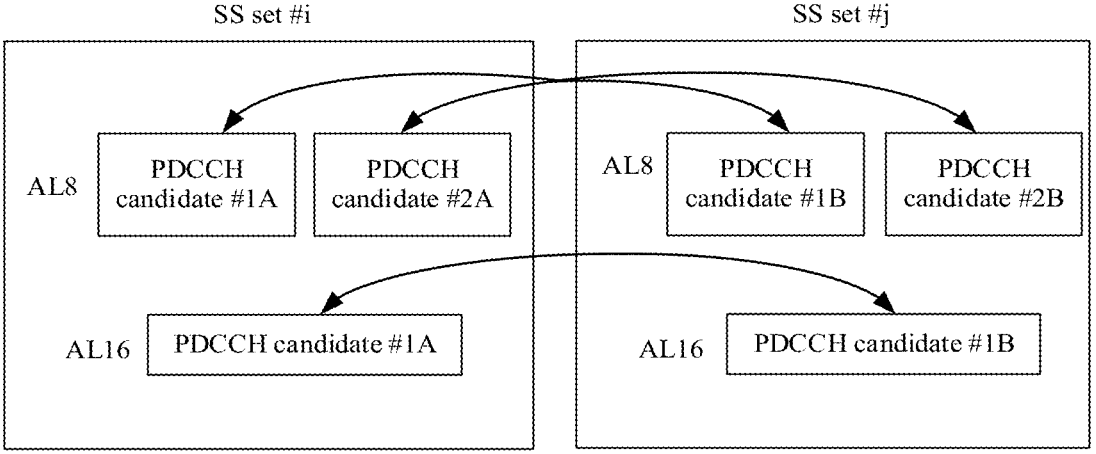
FIG. 3 is a schematic diagram of an associated PDCCH candidate and an associated search space set according to an embodiment of this disclosure.

FIG. 3 is used as an example to describe linked PDCCH candidate(s) and linked SS set(s). With reference to FIG. 3, the SS set #i and the SS set #j are mutually linked SS sets, and the linkage between the SS set #i and the SS set #j is configured by a network device. PDCCH candidates used for PDCCH repetition transmission are two PDCCH candidates in the SS set #i and the SS set #j, respectively. It is assumed that the SS set #i includes search space at an aggregation level 8 (AL8) and search space at an aggregation level 16, and the search space at the aggregation level 8 and the search space at the aggregation level 16 respectively correspond to two PDCCH candidates and one PDCCH candidate. The SS set #j includes search space at AL8 and search space at AL16, which respectively correspond to two PDCCH candidates and one PDCCH candidate. PDCCH candidates in each search space may be numbered according to a mapping relationship predefined by a protocol. For example, two PDCCH candidates in the SS at AL8 in the SS set #i are respectively numbered as a PDCCH candidate #1A and a PDCCH candidate #2A according to the mapping relationship predefined by the protocol. PDCCHs in other search space in the figure are numbered in a similar manner, and details are not described again. Regarding AL8, the PDCCH candidate #1A in the SS set #i and a PDCCH candidate #1B in the SS set #j are used together for PDCCH repetition transmission, and the PDCCH candidate #2A in the SS set #i and a PDCCH candidate #2B in the SS set #j are used together for PDCCH repetition transmission. Regarding AL16, the PDCCH candidate #1A in the SS set #i and the PDCCH candidate #1B in the SS set #j are used together for PDCCH repetition transmission. It should be noted that all PDCCH candidates in the set #i and the SS set #j are used for PDCCH repetition transmission. If a network device sends an individual PDCCH to a terminal, the sending may be implemented by configuring another SS set, for example, configuring an SS set #k.

Figure 4:
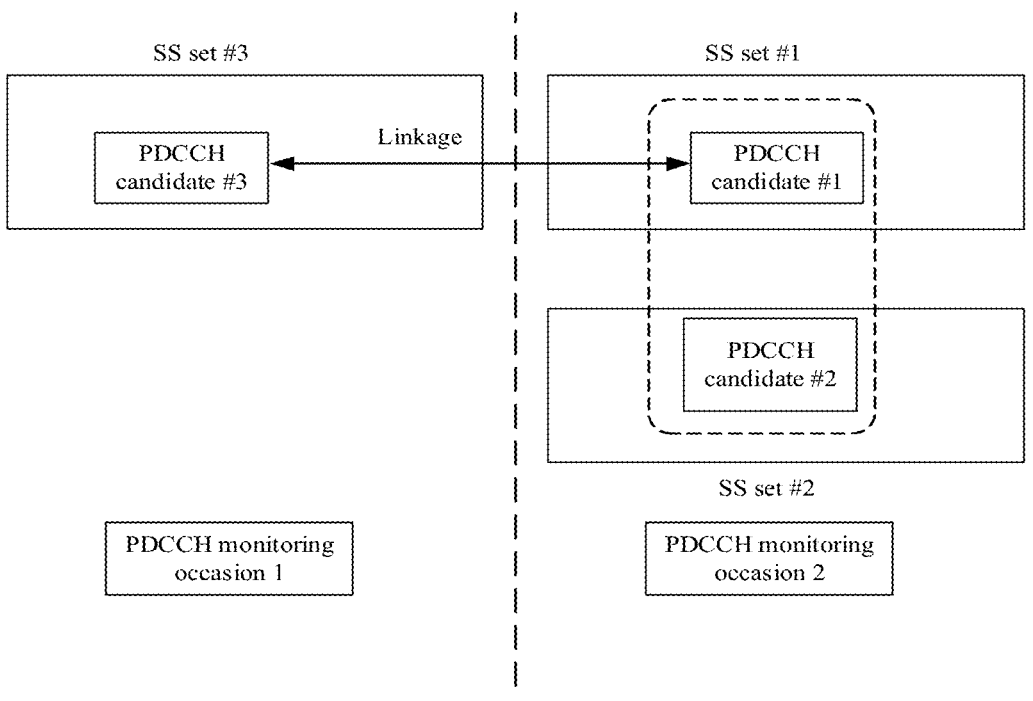
FIG. 4 is a schematic diagram of PDCCH resource overlapping according to an embodiment of this disclosure.

Because periods of the two SS sets may be different, an individual SS set and a linked SS set may have PDCCH candidates with overlapped resources in a monitoring period. In other words, there is a scenario in which resources corresponding to the individual PDCCH candidate and the linked PDCCH candidate are the same, that is, the resources fully overlap. If the terminal monitors a PDCCH on an overlapped resource, it may fail to distinguish whether the PDCCH is an individual PDCCH candidate or a linked PDCCH candidate. With reference to FIG. 4, an SS set #1 and an SS set #3 are a pair of SS sets used for PDCCH repetition transmission. A PDCCH candidate #1 in the SS set #1 and a PDCCH candidate #3 in the SS set #2 are a pair of linked PDCCH candidates. An SS set #2 includes one or more individual PDCCH candidates including a PDCCH candidate #3. The PDCCH candidate #1 and the PDCCH candidate #2 are located on a same resource, a monitoring occasion in which the SS set #3 is located is earlier than monitoring occasions in which the SS set #1 and the SS set #2 are located. It is assumed that a terminal does not monitor a PDCCH in the SS set #3, but monitors a PDCCH on the resource of the SS set #1 and the SS set #2 (that is, the PDCCH is successfully decoded). In this case, the terminal cannot determine whether the PDCCH is located on the PDCCH candidate #1 or the PDCCH candidate #2. In other words, the terminal cannot determine whether the PDCCH is an independently transmitted PDCCH or a repeatedly transmitted PDCCH. For example, it is assumed that interference on a resource of the SS set #3 is strong, and consequently the terminal fails to decode the SS set #3. In addition, the terminal detects a PDCCH on the overlapped resource of the SS set #1 and the SS set #2. If the terminal attempts to combine and decode a resource of the monitored PDCCH and a resource of the SS set #3, because strong interference exists in the SS set #3 and may cause failure in combination and decoding of the resource of the monitored PDCCH and the resource of the SS set #3, the terminal may mistakenly consider that the PDCCH is an independently transmitted PDCCH, which is inconsistent with the understanding that the network device actually sends a repeatedly transmitted PDCCH. Consequently, data transmission related to the PDCCH fails.

Because the terminal cannot determine, on the overlapped resource, whether the detected PDCCH is an independently transmitted PDCCH or a repeatedly transmitted PDCCH, the terminal cannot determine whether a reference PDCCH candidate is determined according to an individual PDCCH candidate or a linked PDCCH candidate. The reference PDCCH candidate may also be referred to as a reference point or a reference PDCCH, and may be used to determine a resource for uplink or downlink data transmission or used to determine some parameters in an uplink or downlink transmission process. If the terminal detects the individual PDCCH, the individual PDCCH may be used as a reference point. However, for PDCCH repetition transmission, same DCI is sent on two linked PDCCH candidates, and the terminal may detect a PDCCH only on a first PDCCH candidate, or may detect a PDCCH only on a second PDCCH candidate, or the terminal may detect a PDCCH on both PDCCH candidates and needs to determine whether an earlier PDCCH candidate or a later PDCCH candidate is used as a reference point.

Therefore, this disclosure provides a communication method, to determine a reference PDCCH candidate when resources corresponding to the individual PDCCH candidate and the linked PDCCH candidate are the same, to keep a consistent understanding of the reference PDCCH candidate between a terminal and a network device.

Unless otherwise specified, the resources described in the embodiments of this disclosure are resources including time domain resources and frequency domain resources, and may be used to carry data or signaling in an uplink communication process or a downlink communication process. The time domain resources and the frequency domain resources may be combined into "time-frequency resources".

It should be understood that the term "and/or" in this specification describes only a linkage between associated objects and indicates that three relationships may exist. For example, A and/or B may indicate the following three cases: only A exists, both A and B exist, and only B exists. In addition, the character "/" in this specification indicates an "or" relationship between the associated objects.

It should be understood that in embodiments of this disclosure, "B corresponding to A" indicates that B is linked with A, and B may be determined based on A. However, it should be further understood that determining B based on A does not mean that B is determined based only on A. B may alternatively be determined based on A and/or other information.

"A plurality of" in embodiments of this disclosure means two or more than two.

Descriptions such as "first" and "second" in embodiments of this disclosure are only used as examples and used to distinguish between objects, but do not indicate a sequence or indicate a specific limitation on a quantity of objects in embodiments of this disclosure, and cannot constitute any limitation on embodiments of this disclosure.

In embodiments of this disclosure, unless otherwise specified, "transmission" (transmit/transmission) means bidirectional transmission, and includes a sending action and/or a receiving action. "Transmission" in this embodiment of this disclosure includes information sending, information receiving, or information sending and information receiving. In other words, information transmission herein includes uplink and/or downlink information transmission. Information may include data and/or signaling, and the like. Uplink information transmission includes uplink data and/or uplink signaling transmission, and downlink information transmission includes downlink data and/or downlink signaling transmission.

Figure 5:
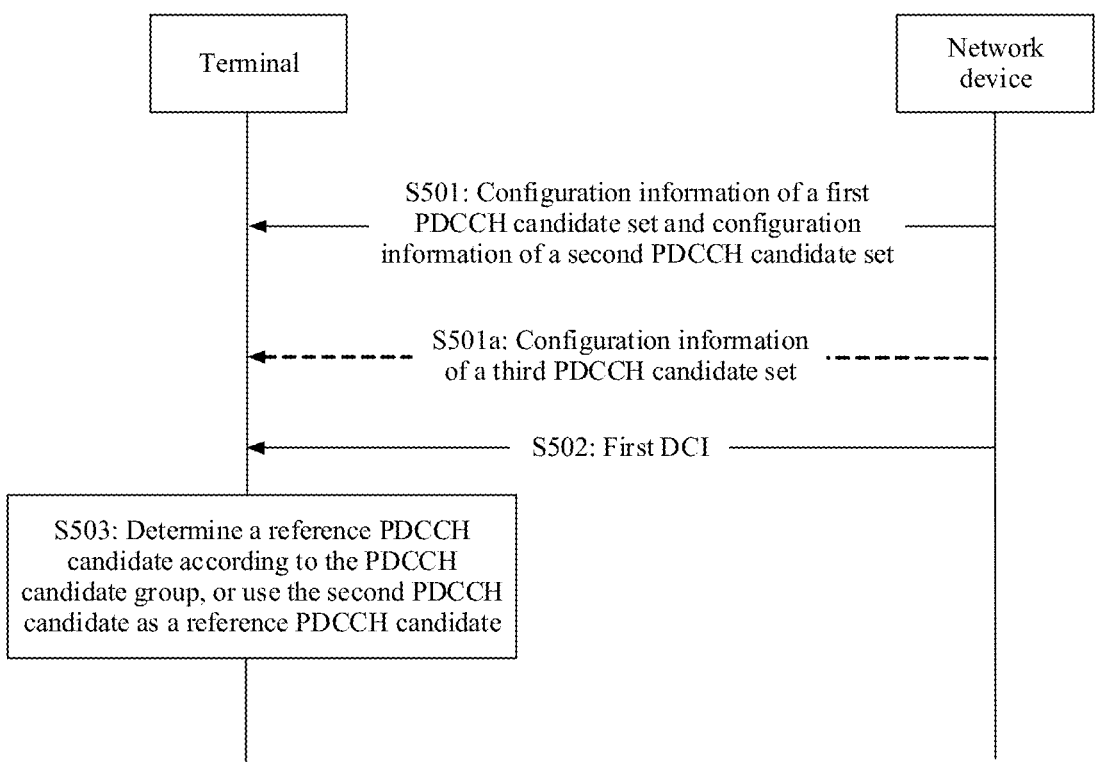
FIG. 5 is a schematic flowchart of a communication method according to an embodiment of this disclosure.

FIG. 5 is a schematic flowchart of a communication method according to an embodiment of this disclosure. It may be understood that the communication method described in the following uses a terminal and a network device as execution bodies, but a type of the execution body is not limited in this disclosure. For example, the communication method described in the following may also be executed by a communication apparatus used for a terminal and a communication apparatus used for a network device. The communication apparatus may be a chip or another apparatus that includes some functions of the terminal or the network device.

As shown in FIG. 5, the method includes the following steps.

S501: A network device sends configuration information of a first PDCCH candidate set and configuration information of a second PDCCH candidate set to a terminal.

Correspondingly, the terminal receives the configuration information of the first PDCCH candidate set and the configuration information of the second PDCCH candidate set.

Optionally, the configuration information of the first PDCCH candidate set and the configuration information of the second PDCCH candidate set may be sent together or separately. This is not particularly limited in this disclosure.

The first PDCCH candidate set includes one or more PDCCH candidates, and the second PDCCH candidate set includes one or more PDCCH candidates. The first PDCCH candidate set is used for PDCCH repetition transmission.

The first PDCCH candidate set and the second PDCCH candidate set may be two search space, or may be two search space sets. The two search space sets may correspond to a same CORESET or different CORESETs.

One or more PDCCH candidates in the first PDCCH candidate set and another one or more PDCCH candidates form a PDCCH candidate group. Two PDCCH candidates in the PDCCH candidate group that are used to transmit same DCI may be referred to as a pair of PDCCH candidates, that is, the foregoing pair of linked PDCCH candidates. It can be understood that the PDCCH candidate group may include one or more pairs of PDCCH candidates, PDCCH candidates in each pair of PDCCH candidates are in a one-to-one correspondence, and each pair of PDCCH candidates may be used to transmit same DCI. For details about the linked PDCCH candidates, refer to the foregoing related content. Details are not described herein again.

The second PDCCH candidate set may include one or more PDCCH candidates that are used for independently transmitting DCIs. For example, the PDCCH candidate set is an individual SS set. For details, refer to the foregoing related content. Details are not described herein again. In other words, the second PDCCH candidate set is not configured for PDCCH repetition transmission.

Optionally, the method further includes S501a: the network device sends configuration information of a third PDCCH candidate set to the terminal, where the first PDCCH candidate set has a linkage with the third PDCCH candidate set.

The third PDCCH candidate set is also one search space or one search space set, and is used for PDCCH repetition transmission. The linkage between the first PDCCH candidate set and the third PDCCH candidate set may be configured by a base station by using higher layer signaling. For example, the configuration information of the first PDCCH candidate set may include identification information of the third PDCCH candidate set, to reflect the linkage between the first PDCCH candidate set and the third PDCCH candidate set.

The third PDCCH candidate set includes one or more PDCCH candidates, and a quantity of PDCCH candidates in the third PDCCH candidate set is the same as and in a one-to-one correspondence with a quantity of PDCCH candidates in the first PDCCH candidate set, to form one or more pairs of PDCCH candidates used to transmit same DCI. In other words, the third PDCCH candidate set and the first PDCCH candidate set may form a pair of linked SS sets. For detailed descriptions of linked SS sets, refer to the foregoing related content. Details are not described herein again.

Optionally, the configuration information of the third PDCCH candidate set and the configuration information of the first or second PDCCH candidate set may be sent together or separately. This is not particularly limited in this disclosure.

Optionally, neither of resources corresponding to the third PDCCH candidate set and the first PDCCH candidate set may overlap, to be specific, neither frequency domain resources nor time domain resources overlap; or resources corresponding to the third PDCCH candidate set and the first PDCCH candidate set may partially overlap, for example, time domain resources fully overlap but frequency domain resources do not overlap, or frequency domain resources fully overlap but time domain resources do not overlap.

Optionally, the configuration information may indicate a time-frequency resource location at which a PDCCH carrying DCI may appear. The configuration information may include: CORESET configuration information and/or search space set configuration information. The CORESET configuration information may indicate a CORESET corresponding to a PDCCH candidate set, and the search space set configuration information may include configuration of the PDCCH candidate set. The PDCCH candidate set herein may be the first PDCCH candidate set, the second PDCCH candidate set, or the third PDCCH candidate set.

The CORESET configuration information may include one or more of the following items: a CORESET identifier or index, a CORESET frequency domain location, CORESET duration, a quantity of OFDM symbols occupied by the CORESET, a scrambling sequence initialization value of DMRS, a CCE-to-REG mapping type, precoding granularity, a transmission configuration indicator (TCI), and a scrambling code identifier. The search space set configuration information may include one or more of the following items: a search space set identifier, an identifier of the CORESET linked with the search space set, a monitoring period and a slot offset in the monitoring period, a monitoring time domain location, an aggregation level and a corresponding quantity of PDCCH candidates, and a DCI format.

After receiving the configuration information of the first PDCCH candidate set and the configuration information of the second PDCCH candidate set, the terminal may separately determine resource locations of PDCCH candidates in the first PDCCH candidate set and the second PDCCH candidate set according to the configuration information.

S502: The network device sends first DCI to the terminal, where the first DCI is carried on a first PDCCH candidate or carried on a second PDCCH candidate, and the first PDCCH candidate and the second PDCCH candidate correspond to a same resource.

In this embodiment of this disclosure, a purpose of the first DCI or information included in the first DCI is not specially limited. For example, the first DCI may be used to schedule downlink data transmission or uplink data transmission.

The first PDCCH candidate belongs to the first PDCCH candidate set, and the second PDCCH candidate belongs to the second PDCCH candidate set. That the first PDCCH candidate and the second PDCCH candidate correspond to a same resource may mean that the first PDCCH candidate and the second PDCCH candidate use a same CCE set. The first PDCCH candidate and the second PDCCH candidate may have a same aggregation level and a same CCE time-frequency location.

The first PDCCH candidate and a third PDCCH candidate that is in the third PDCCH candidate set belong to the PDCCH candidate group, and are used to transmit same DCI. For example, when the network device adopts PDCCH repetition transmission, the first PDCCH candidate and the third PDCCH candidate are used to transmit the first DCI. The first PDCCH candidate and the third PDCCH candidate form a pair of PDCCH candidates used for PDCCH repetition transmission, that is, the foregoing pair of linked PDCCH candidates. It may be understood that, in this disclosure, it is not limited that only the first PDCCH candidate and the third PDCCH candidate are used to transmit same DCI, and one or more other PDCCH candidates and the first PDCCH candidate or the third PDCCH candidate may become linked PDCCH candidates for each other, and are used to transmit same DCI.

Correspondingly, the terminal receives the first DCI.

The terminal monitors one or more PDCCH candidate sets configured by the network device for the terminal, for example, including the first PDCCH candidate set, the second PDCCH candidate set, and the third PDCCH candidate set. The terminal separately performs, according to the configuration information corresponding to each PDCCH candidate set, processing including decoding, CRC check, and the like on each PDCCH candidate in the first PDCCH candidate set, each PDCCH candidate in the second PDCCH candidate set, and each PDCCH candidate in the third PDCCH candidate set. When the CRC check succeeds, it may be considered that the terminal receives the first DCI.

For ease of description, the first PDCCH candidate and the second PDCCH candidate that appear in embodiments shown in FIG. 5 to FIG. 8 are two PDCCH candidates that respectively belong to the first PDCCH candidate set and the second PDCCH candidate set and that have a same resource, but do not represent another PDCCH candidate in the first PDCCH candidate set or the second PDCCH candidate set.

In this embodiment of this disclosure, the first PDCCH candidate, the second PDCCH candidate, and the third PDCCH candidate may be a PDCCH candidate #1, a PDCCH candidate #2, and a PDCCH candidate #3 respectively, and the first PDCCH candidate set, the second PDCCH candidate set, and the third PDCCH candidate set may be an SS set #1, an SS set #2, and an SS set #3 respectively.

It is assumed that {PDCCH candidate #1, PDCCH candidate #3} is used to transmit DCI #1. If the terminal performs decoding on {PDCCH candidate #1, PDCCH candidate #3}, there may be the following several processing manners:

Manner 1: Decoding is performed on only combined information of the PDCCH candidate #1 and the PDCCH candidate #3. When the combined information is correctly decoded, the UE considers that the DCI #1 is successfully received.

Manner 2: Decoding is performed on the PDCCH candidate #1, and decoding is performed on the PDCCH candidate #3. As long as one of the two is correctly decoded, the UE considers that the DCI #1 is successfully received.

Manner 3: Decoding is performed on the PDCCH candidate #1, decoding is performed on the PDCCH candidate #3, and decoding is performed on the combined information of the PDCCH candidate #1 and the PDCCH candidate #3. As long as one of the three is correctly decoded, the UE considers that the DCI #1 is successfully received.

In this embodiment of this disclosure, that a resource corresponding to the first PDCCH candidate is the same as a resource corresponding to the second PDCCH candidate means that time domain resources corresponding to the first PDCCH candidate and the second PDCCH candidate fully overlap, and frequency domain resources corresponding to the first PDCCH candidate and the second PDCCH candidate fully overlap. In other words, the first PDCCH candidate and the second PDCCH candidate are located on the fully overlapped resources.

Additionally, in addition to that the resources corresponding to the first PDCCH candidate that may carry the first DCI and corresponding to the second PDCCH candidate fully overlap, the first PDCCH candidate set and the second PDCCH candidate set may further correspond to another overlapped resource. In this disclosure, it is not limited that the resources corresponding to the first PDCCH candidate set and the second PDCCH candidate set completely or partially overlap.

Optionally, in addition to corresponding to the same resources (using a same CCE set), the first PDCCH candidate and the second PDCCH candidate further meet the following conditions: the first PDCCH candidate and the second PDCCH candidate have a same scrambling code sequence; and the first PDCCH candidate and the second PDCCH candidate carry downlink control information of a same payload size. Optionally, the conditions further include: the first PDCCH candidate and the second PDCCH candidate are respectively linked with a same CORESET, or correspond to different CORESETs but have a same scrambling code, or correspond to different CORESETs but have a same quasi co-location characteristic. When resources corresponding to the first PDCCH candidate and the second PDCCH candidate are the same, and the foregoing listed several conditions are met, the first PDCCH candidate and the second PDCCH candidate may be counted as one PDCCH candidate to be monitored, or the two PDCCH candidates meet a counting rule for performing blind detection once, so that complexity and power consumption of blind detection performed by the terminal can be reduced.

S503: The terminal determines a reference PDCCH candidate according to the PDCCH candidate group, or uses the second PDCCH candidate as a reference PDCCH candidate, where a time domain location of the reference PDCCH candidate is used to determine a resource for uplink information transmission or downlink information transmission.

It may be understood that manners in which the network device and the terminal determine the reference PDCCH candidate are the same, including: determining the reference PDCCH candidate according to the PDCCH candidate group, or using the second PDCCH candidate as the reference PDCCH candidate.

It should be noted that, in this disclosure, an execution sequence of a step of determining the reference PDCCH candidate by the network device and a step of sending the first DCI by the network device to the terminal is not limited.

The following uses a terminal side as an example to describe a specific manner of determining the reference PDCCH candidate. Details are not described herein again on a network device side.

After obtaining the first DCI, the terminal determines a reference PDCCH candidate, that is, a reference point, to perform subsequent downlink data transmission or uplink data transmission. The reference PDCCH candidate may be used as a reference point for downlink information transmission or uplink information transmission. If the terminal determines the reference PDCCH candidate according to the PDCCH candidate group, different PDCCH candidates in the PDCCH candidate group may be used as reference points for different communication processes.

For example, in a downlink data transmission process, when a time domain location of a PDSCH is determined according to a scheduling offset K0, a PDCCH candidate at a later time domain location in a pair of PDCCH candidates (for example, the first PDCCH candidate and the third PDCCH candidate) that include the first PDCCH candidate in the PDCCH candidate group may be used as a reference point, where K0 indicates whether the PDSCH received by the terminal is in a same slot as or a different slot from a PDCCH that schedules the PDSCH. K0=0 indicates that the offset is 0 slots, that is, the scheduled PDSCH and the PDCCH is in the same slot. K0=1 indicates that the offset is one slot, that is, a difference between the scheduled PDSCH and the PDCCH is one slot.

Figure 6:
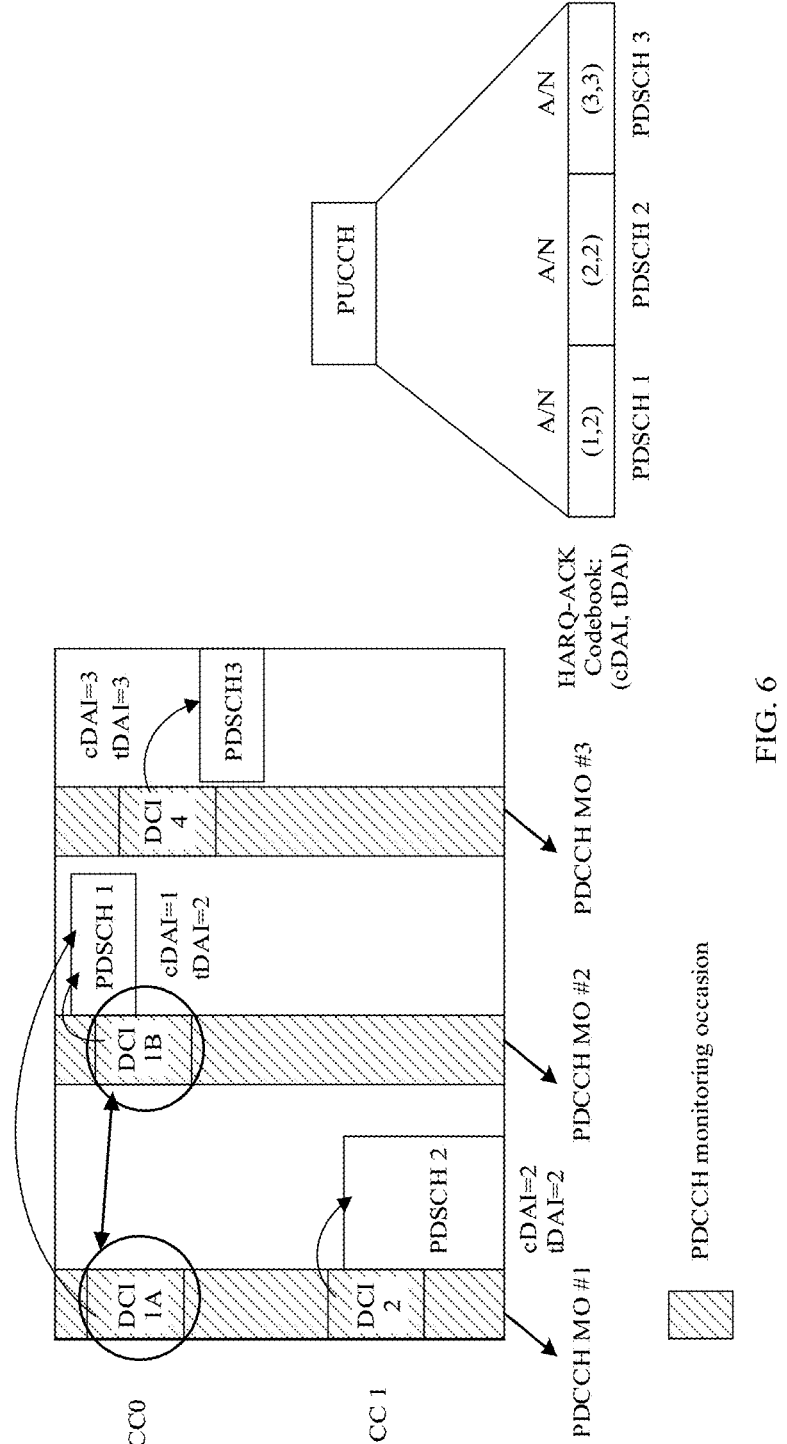
FIG. 6 is a schematic diagram of determining a C-DAI and a T-DAI according to an embodiment of this disclosure.

For another example, in the downlink data transmission process, when a C-DAI or a T-DAI is determined, a PDCCH candidate at an earlier time domain location in a pair of PDCCH candidates that include the first PDCCH candidate may be used as a reference point. The C-DAI and the T-DAI are used to determine a location, in the codebook, of the HARQ-ACK corresponding to the PDSCH. As shown in FIG. 6, it is assumed that {PDCCH candidate #1, PDCCH candidate #3} carries {DCI 1A, DCI 1B}, the DCI 1A and the DCI 1B are the same DCI, and are both used to schedule a PDSCH 1. The PDCCH candidate #1 is located in an earlier PDCCH MO #1, and the PDCCH candidate #3 is located in a later PDCCH MO #2. A PDCCH MO #1 transmits the DCI 1A and DCI 2. The DCI 2 schedules a PDSCH 2, and a cell identifier (CC0) corresponding to the DCI 1 is less than a cell identifier (CC1) corresponding to the DCI 2. In addition, a PDCCH MO #3 transmits DCI 4, and the DCI 4 is used to schedule a PDSCH 3. The PDCCH candidate #1 is used as a reference point to determine a C-DAI and a T-DAI that correspond to the PDSCH 1, including: obtaining, according to a total quantity of DCI transmitted in the PDCCH MO #1, T-DAI=2; and obtaining, by using the DCI 1 as the earliest DCI in the PDCCH MO #1, C-DAI=1. For the C-DAI and the T-DAI of the DCI 1B on the PDCCH candidate #3, values of the C-DAI and the T-DAI that are determined by using the PDCCH candidate #1 may be used, to be specific, C-DAI=1 and T-DAI=2. In addition, it may be further determined that a value of a C-DAI and a value of a T-DAI that correspond to the DCI 2 are (2, 2), and a value of a C-DAI and a value of a T-DAI that correspond to the DCI 4 are (3, 3). Details are not described herein again.

For another example, in an uplink data transmission process, when processing time Z of a channel state information reference signal (CSI-RS) is determined, a PDCCH candidate at a later time domain location in a pair of PDCCH candidates including the first PDCCH candidate may be used as a reference point. The processing time Z of the CSI-RS is used to limit that a PUSCH scheduled by a network device for CSI reporting cannot be earlier than Z symbols, and a terminal processes DCI, receives and processes the CSI-RS, prepares uplink data, and the like in the Z symbols. A start location of the Z symbols may be determined according to the time domain location of the PDCCH candidate whose time domain location is later. For example, Z symbols are counted backward from a next symbol of an end symbol of the PDCCH candidate whose time domain location is later.

For another example, in an uplink control information transmission process, when a resource location of a physical uplink control channel (PUCCH) is determined, a reference point is a PDCCH candidate corresponding to a control resource set identifier (ID) or a smallest SS set ID in a pair of PDCCH candidates including the first PDCCH candidate. The PDCCH candidate set is an SS set, and when a quantity of resources in a PUCCH resource set is greater than eight, a quantity of available PUCCH resources is limited to not exceed eight, and a location of a resource in the PUCCH resource set is determined together by using a PDCCH candidate corresponding to a smallest CORESET ID or the smallest SS set ID and a mapping relationship predefined by a protocol. In addition to using a reference PDCCH candidate to determine a resource for uplink information or downlink information transmission, the reference PDCCH candidate may be further used in some other communication processes, for example, used to determine whether DCI for scheduling uplink data transmission is legal. The reference PDCCH candidate may be used to determine N2 symbols in processing time of a physical uplink shared channel (PUSCH). If the terminal receives DCI used for scheduling uplink data transmission, the terminal counts N2 symbols starting from a next symbol of the end symbol of the DCI. If the terminal finds that a start symbol of the uplink data transmission scheduled by the DCI is within the N2 symbols, it indicates that the DCI is illegal, and the terminal ignores the DCI and does not perform further processing. If a PDCCH candidate group is used, the end symbol of the DCI may be determined according to a time domain location of a PDCCH candidate whose time domain location is later in a pair of PDCCH candidates including the first PDCCH candidate. In other words, a start symbol of N2 symbols may be determined according to the time domain location of the PDCCH candidate. For example, the N2 symbols are counted from a next symbol of the end symbol of the PDCCH candidate at a later time domain location.

It may be understood that the PDCCH candidate at the earlier or later time domain location may be determined in different manners in different scenarios. If PDCCH candidates used for PDCCH repetition transmission are located in one slot, a time domain location may be determined according to a value of a start symbol index of a PDCCH candidate. For example, a PDCCH candidate with a smallest start symbol index is a PDCCH candidate with a relatively earlier time domain location. If PDCCH candidates used for PDCCH repetition transmission are located in different slots, a time domain location may be determined according to a slot number. For example, a PDCCH candidate located in a slot with a smallest slot number is a PDCCH candidate with an earlier time domain location.

That the PDCCH candidate group includes {PDCCH candidate #1, PDCCH candidate #3} is still used as an example. A start symbol index of the PDCCH candidate #1 is less than a start symbol index of the PDCCH candidate #3, an SS set #1 where the PDCCH candidate #1 is located corresponds to a CORESET #2, an SS set #3 where the PDCCH candidate #3 is located corresponds to a CORESET #1, and a resource corresponding to the PDCCH candidate #1 is the same as a resource of a PDCCH candidate #2 for independently transmitting DCI (for ease of description, numbers such as #1 and #2 represent identifiers or indexes). When the time domain location of the PDSCH, the processing time N2 of the PUSCH, or the processing time Z of the CSI-RS is determined, the PDCCH candidate #3 may be used as a reference point, and when the C-DAI or the T-DAI is determined, the PDCCH candidate #1 may be used as a reference point. When a resource location of the PUCCH is determined, if a CORESET ID is used as basis of determination, the PDCCH candidate #3 is determined as a reference point; and if an SS set ID is used as basis of determination, the PDCCH candidate #1 is determined as a reference point.

According to the communication method provided in this disclosure, a reference PDCCH candidate is determined based on a PDCCH candidate group used for repetition transmission or a PDCCH candidate used for independent transmission. This resolves a problem that a terminal cannot distinguish, on an overlapped resource, whether a PDCCH is an independently transmitted PDCCH or a repeatedly transmitted PDCCH. In this way, the terminal and the network device have a consistent understanding of a manner of determining a reference point related to the PDCCH that is detected by the terminal on the overlapped resource, thereby improving communication reliability.

Optionally, in an implementation of this disclosure, regardless of whether the first DCI is carried on the first PDCCH candidate or the second PDCCH candidate, the terminal determines a reference PDCCH candidate according to the PDCCH candidate group. In other words, regardless of whether the first DCI received by the terminal is carried on the PDCCH candidate for independent transmission or the PDCCH candidate for repetition transmission, the terminal determines a reference PDCCH candidate according to the PDCCH candidate group. Regarding a sending end, the network device may perform PDCCH repetition transmission or PDCCH independent transmission on resources corresponding to the first PDCCH candidate and the second PDCCH candidate.

Figure 7:
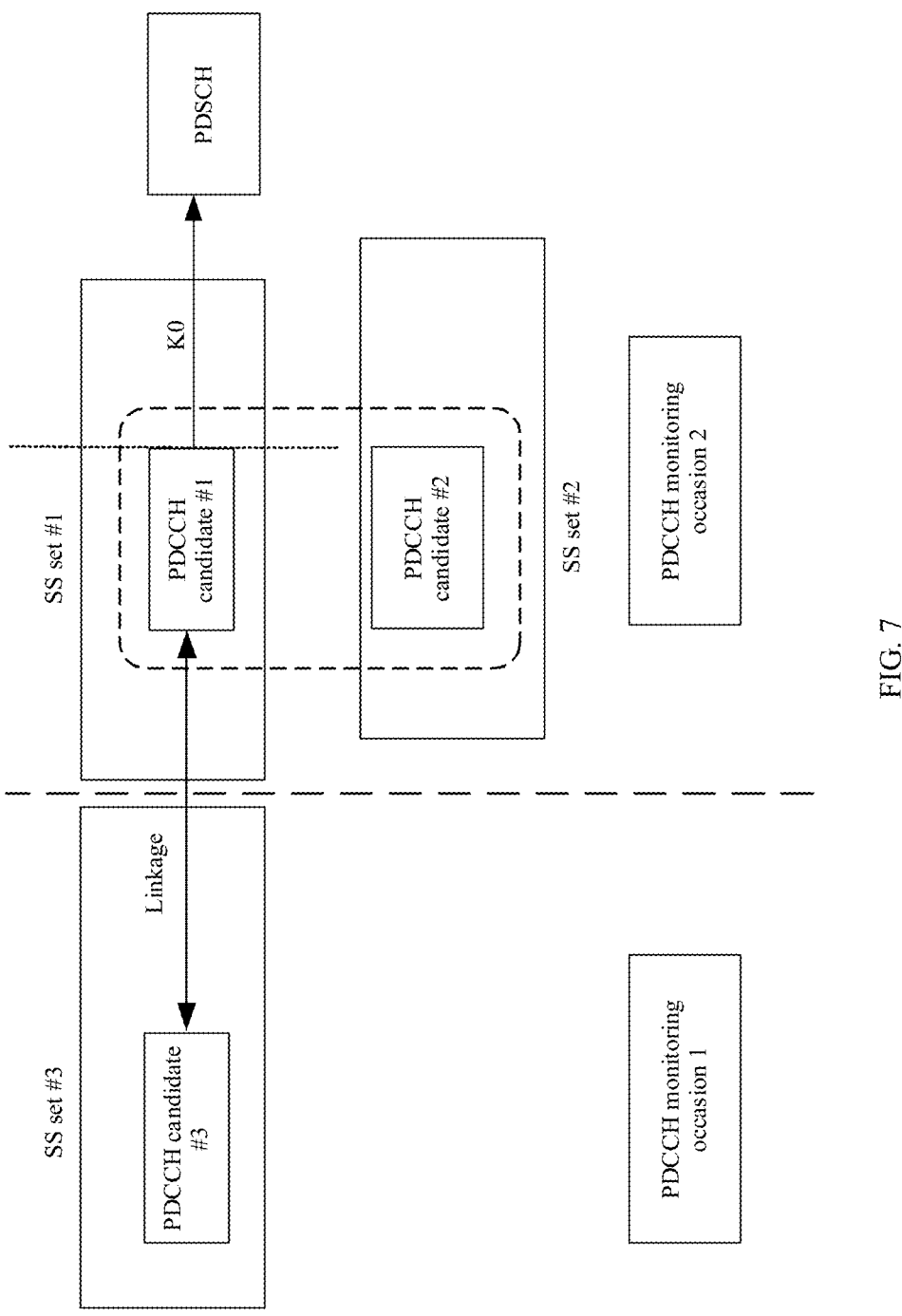
FIG. 7 is a schematic diagram of a scenario of determining a reference PDCCH candidate according to an embodiment of this disclosure.

FIG. 7 is used as an example to describe a process of determining a reference point (reference PDCCH candidate) in this implementation. As shown in FIG. 7, resources corresponding to an SS set #1 and an SS set #2 overlap, and a PDCCH candidate #1 in the SS set #1 and a PDCCH candidate #2 in the SS set #2 are located on the overlapped resources. The SS set #1 and an SS set #3 are used for PDCCH repetition transmission, and the PDCCH candidate

1 and a PDCCH candidate #3 in the SS set #3 are mutually linked PDCCH candidates. A network device configures, by using RRC parameters, the two SS sets to have a linkage. PDCCH candidates in the SS set #2 are used to independently transmit DCI. When a terminal detects a PDCCH on an overlapped resource, regardless of whether the detected PDCCH is the PDCCH candidate #1 or the PDCCH candidate #2, the terminal determines a reference point according to the linked PDCCH candidates, that is, the PDCCH candidate #1 or the PDCCH candidate #3. For example, even if the network device actually sends DCI on the PDCCH candidate #2, when the terminal detects a PDCCH on an overlapped resource, the terminal may determine a related reference point according to the linked PDCCH candidates. For example, assuming that K0=1, when a time domain location used to send the PDSCH is calculated, a later PDCCH candidate in the PDCCH candidate #1 and the PDCCH candidate #3 is used as a basis, and one slot is offset from a next symbol of the end symbol of the PDCCH candidate #1, to obtain the time domain location of the PDSCH. The network device also determines, according to a same understanding as the terminal, the time domain location used to send the PDSCH by using the PDCCH candidate #1 as a reference point.

Figure 8:
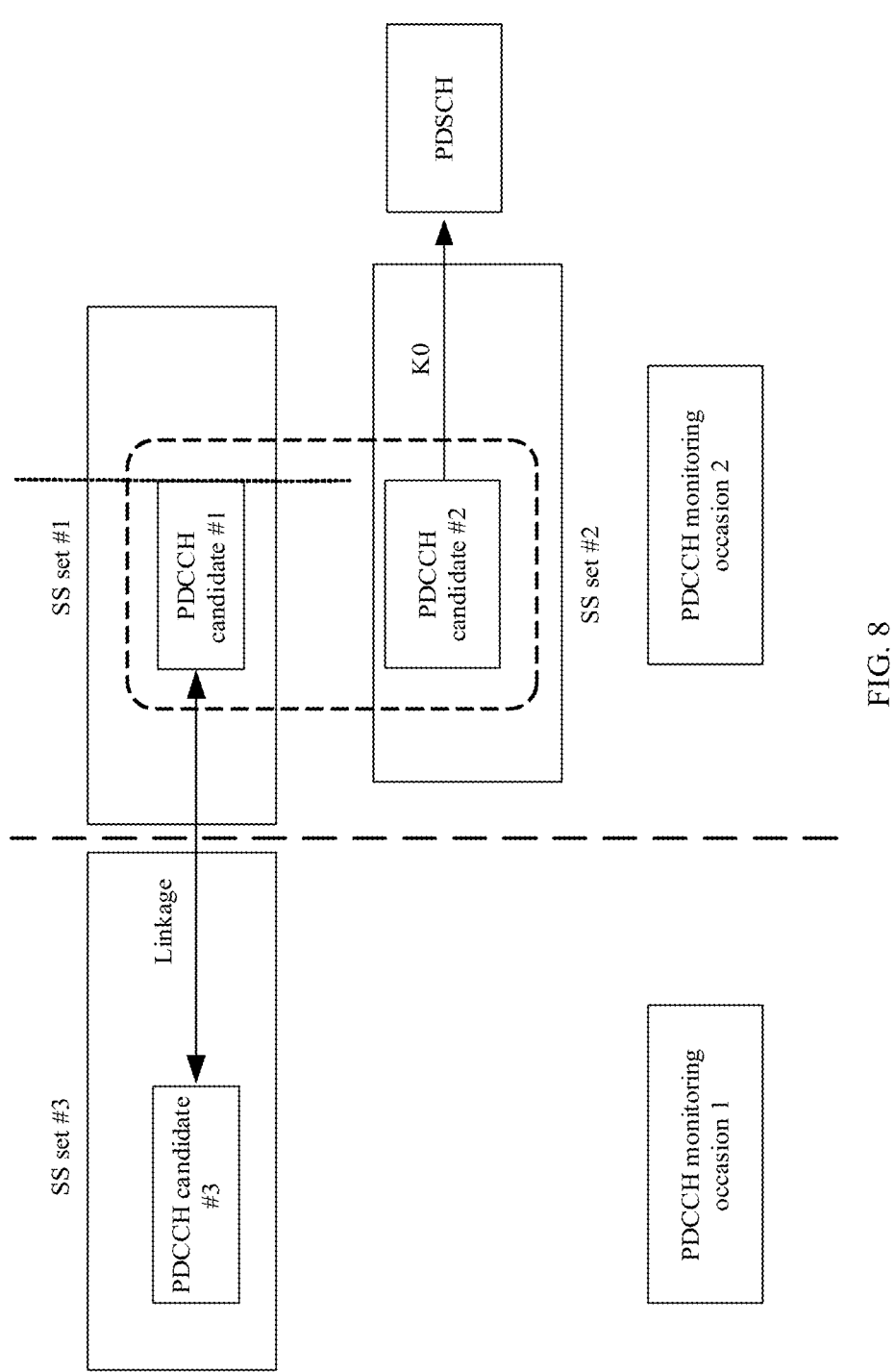
FIG. 8 is a schematic diagram of a scenario of determining a reference PDCCH candidate according to an embodiment of this disclosure.

Optionally, in an implementation of this disclosure, regardless of whether the first DCI is carried on the first PDCCH candidate or the second PDCCH candidate, the terminal uses the second PDCCH candidate as a reference PDCCH candidate. In other words, regardless of whether the first DCI received by the terminal is carried on a PDCCH candidate for independent transmission or a PDCCH candidate for repetition transmission, the terminal determines a reference point according to the PDCCH candidate for independent transmission. As shown in FIG. 8, a terminal determines a time domain location of a PDSCH by using a PDCCH candidate #2 as a reference point. Details are not described herein again.

By using the foregoing two implementations, scheduling flexibility of a network device is improved, and the network device is not limited to sending, on an overlapped resource, only an independently transmitted PDCCH, or only a repeatedly transmitted PDCCH. In addition, because whether a PDCCH sent by the network device is a repeatedly transmitted PDCCH or an independently transmitted PDCCH is not limited, determining a reference PDCCH candidate by using the foregoing two implementations does not constitute a limitation on a decoding manner of the terminal.

Optionally, in an implementation of this disclosure, the receiving first DCI includes: receiving the first DCI according to configuration information of a first PDCCH candidate set; or receiving the first DCI according to configuration information of a second PDCCH candidate set.

The receiving the first DCI includes: determining a format of the DCI carried on the first PDCCH candidate or the second PDCCH candidate, and determining domain information of the DCI and a payload size of the DCI corresponding to the format of the DCI. The receiving the first DCI according to the configuration information of the first PDCCH candidate set includes: monitoring only each PDCCH candidate in the first PDCCH candidate set, and skipping monitoring PDCCH candidates in the second PDCCH candidate set. The terminal assumes that the first DCI is transmitted only through the first PDCCH candidate in the first PDCCH candidate set, and therefore, the terminal attempts to decode the first DCI only within a range of the first PDCCH candidate set. Correspondingly, to keep consistent understanding between the terminal and the network device, the network device transmits the first DCI only on the first PDCCH candidate by using the configuration information (for example, a DCI format) of the first PDCCH candidate set, and does not transmit the first DCI by using the second PDCCH candidate. Similarly, the determining the first DCI according to the configuration information of the second PDCCH candidate set includes: monitoring only the second PDCCH candidate set, and skipping monitoring the first PDCCH candidate set. Details are not described herein again. It may be understood that, in this implementation, the first PDCCH candidate set and the second PDCCH candidate set are search space sets respectively.

In this implementation, a receiving behavior of the terminal on an overlapped resource is predefined. The terminal may assume that a PDCCH received on the overlapped resource is a repeatedly transmitted PDCCH or an independently transmitted PDCCH. Correspondingly, the network device sends, on this resource, only a repeatedly transmitted PDCCH, or only an independently transmitted PDCCH. Whether the PDCCH actually monitored by the terminal is an independently transmitted PDCCH or a repeatedly transmitted PDCCH is determined according to a predefined rule. Correspondingly, the reference PDCCH candidate is also determined according to the following predefined rules: when the first DCI is determined according to the configuration information of the first PDCCH candidate set, the terminal determines the reference PDCCH candidate according to the PDCCH candidate group; and when the first PDCCH is determined according to the configuration information of the second PDCCH candidate set, the terminal uses the second PDCCH candidate as the reference PDCCH candidate. Regarding a process of determining a reference PDCCH candidate, refer to related content in the foregoing implementations. Details are not described herein again.

This implementation affects the monitoring behavior of the terminal. The terminal assumes that the received first DCI is carried on the first PDCCH candidate, that is, the terminal assumes that the first DCI is repeatedly transmitted. If the terminal does not detect the first DCI on the first PDCCH candidate located on the overlapped resource, because the terminal knows that the network device performs PDCCH repetition transmission on the overlapped resource, the terminal may perform soft combination on another PDCCH candidate that has a linkage with the first PDCCH candidate and then perform decoding, to enhance PDCCH reliability by using a combination gain, or it is assumed that the terminal monitors a PDCCH candidate according to the configuration information of the first PDCCH candidate set. If the terminal assumes that the received first DCI is carried on the second PDCCH candidate, that is, if the terminal assumes that the first DCI is independently transmitted, when the terminal does not detect the DCI on the overlapped resource, because the terminal knows that the network device performs PDCCH repetition transmission on the overlapped resource, the terminal does not use another PDCCH candidate for soft combination and decoding.

In this implementation, a problem that the terminal cannot distinguish, on an overlapped resource, whether a monitored PDCCH is repeatedly transmitted or a monitored PDCCH is independently transmitted is resolved by increasing a scheduling limitation of the network device, so that the terminal and the network device have a consistent understanding of a manner of determining a reference point related to the PDCCH monitored on the overlapped resource, thereby improving communication reliability.

Figures 9, 10:
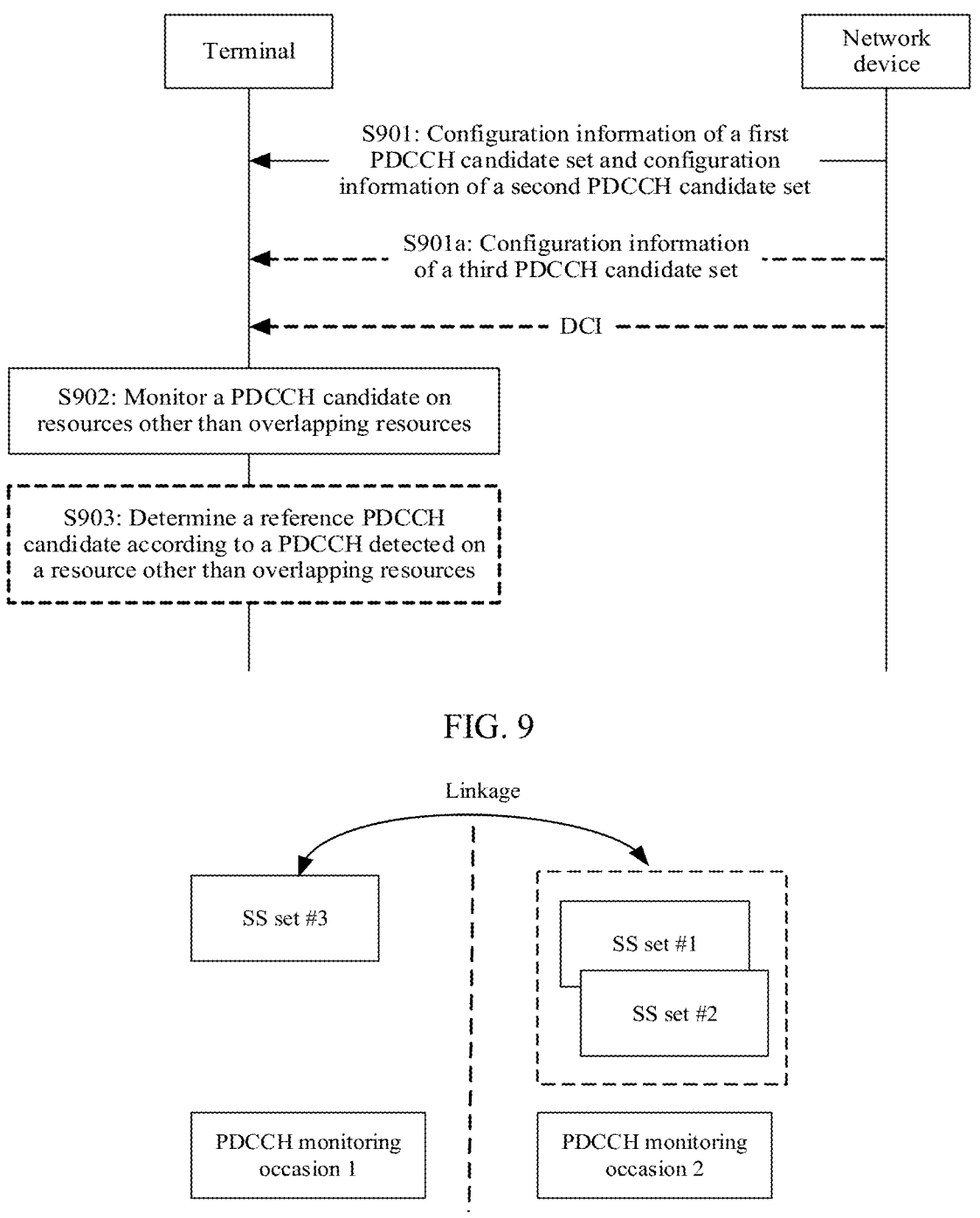
FIG. 9 is a schematic flowchart of another communication method according to an embodiment of this disclosure.
FIG. 10 is a schematic diagram of resource overlapping of a search space set according to an embodiment of this disclosure.

FIG. 9 is a schematic flowchart of a communication method according to an embodiment of this disclosure. In the embodiment shown in FIG. 9, a terminal does not monitor a PDCCH candidate in an overlapping part of two PDCCH candidate sets, to avoid a problem that whether a monitored PDCCH is an independently transmitted PDCCH or a repeatedly transmitted PDCCH cannot be determined.

As shown in FIG. 9, the method includes the following steps.

S901: A network device sends configuration information of a first PDCCH candidate set and configuration information of a second PDCCH candidate set to the terminal, where a resource corresponding to the first PDCCH candidate set overlaps a resource corresponding to the second PDCCH candidate set.

Correspondingly, the terminal receives the configuration information of the first PDCCH candidate set and the configuration information of the second PDCCH candidate set. For descriptions of specific content of the configuration information, refer to related descriptions in the foregoing embodiments. Details are not described herein again.

The first PDCCH candidate set includes a first PDCCH candidate, the first PDCCH candidate belongs to a PDCCH candidate group, and the first PDCCH candidate and a third PDCCH candidate that is in the PDCCH candidate group are used to transmit same DCI; and the second PDCCH candidate set includes a second PDCCH candidate, the first PDCCH candidate and the second PDCCH candidate are located on an overlapped resource, and the third PDCCH candidate belongs to a third PDCCH candidate set.

Each of the first PDCCH candidate set and the second PDCCH candidate set includes at least one PDCCH candidate. In this disclosure, a PDCCH candidate set in the first PDCCH candidate set on the overlapped resource is referred to as the first PDCCH candidate, and a PDCCH candidate set in the second PDCCH candidate set on the overlapped resource is referred to as the second PDCCH candidate. It may be understood that there may be one or more first PDCCH candidates and second PDCCH candidates on the overlapped resource.

Optionally, the method further includes S901a: the network device sends configuration information of the third PDCCH candidate set to the terminal, where the first PDCCH candidate set has a linkage with the third PDCCH candidate set.

The first PDCCH candidate set and the third PDCCH candidate set may be linked search space sets (linked SS sets) used for PDCCH repetition transmission, and the first PDCCH candidate and the third PDCCH candidate form a pair of linked PDCCH candidates. For detailed descriptions of the PDCCH candidate group, the linked SS sets, the linked PDCCH candidates, and the like, refer to related content in the embodiments shown in FIG. 5 to FIG. 8. Details are not described herein again.

Optionally, in an implementation, the terminal may determine, according to the configuration information, an overlapped status between resources corresponding to the first PDCCH candidate set and the second PDCCH candidate set.

Optionally, that a resource corresponding to the first PDCCH candidate set overlaps a resource corresponding to the second PDCCH candidate set includes: the time domain resources or frequency domain resources corresponding to the first PDCCH candidate set and the second PDCCH candidate set partially overlap. For example, the time domain resources corresponding to the first PDCCH candidate set and the second PDCCH candidate set fully overlap, and frequency domain resources corresponding to the first PDCCH candidate set and the second PDCCH candidate set partially overlap; or the time domain resources corresponding to the first PDCCH candidate set and the second PDCCH candidate set partially overlap, and frequency domain resources corresponding to the first PDCCH candidate set and the second PDCCH candidate set partially overlap or fully overlap. There may be the one or more first PDCCH candidates and second PDCCH candidates on the overlapped resources.

Optionally, in addition to the foregoing description of the overlapped status of the resources corresponding to the first PDCCH candidate set and the second PDCCH candidate set, some restrictions may be added to a relationship between the two PDCCH candidate sets, including: the first PDCCH candidate set and the second PDCCH candidate set correspond to DCI of a same payload size; or the first PDCCH candidate set and the second PDCCH candidate set correspond to a same scrambling code; or any one or more of conditions such as that the first PDCCH candidate set and the second PDCCH candidate set correspond to DCI of a same format. In other words, in addition to the corresponding resource overlapping, the two PDCCH candidate sets further meet one or more of the foregoing conditions, and the terminal performs S902.

Optionally, the network device may configure, by using higher layer signaling such as RRC signaling, that DCI formats monitored by the terminal in the first PDCCH candidate set and the second PDCCH candidate set are the same, for example, both are DCI format 1_1 or DCI format 1_2, and/or payload sizes of the monitored DCIs are the same.

Optionally, in addition to the resource overlapping between the first PDCCH candidate set and the second PDCCH candidate set, when the first PDCCH candidate and the second PDCCH candidate on the overlapped resource further meet conditions such as a same corresponding resource, a same scrambling code sequence, and a same payload size of carried DCIs, the terminal performs S902. For descriptions of the foregoing conditions, refer to the foregoing related content. Details are not described herein again.

S902: The terminal monitors a PDCCH candidate on a resource that is in the first PDCCH candidate set and that does not overlap any resource of the second PDCCH candidate set, and monitors a PDCCH candidate on a resource that is in the second PDCCH candidate set and that does not overlap any resource of the first PDCCH candidate set.

The terminal does not monitor a PDCCH candidate on an overlapped resource corresponding to the first PDCCH candidate set and the second PDCCH candidate set, and monitors only a PDCCH candidate on a resource other than the overlapped resource, including a PDCCH candidate other than the first PDCCH candidate in the first PDCCH candidate set and a PDCCH candidate other than the second PDCCH candidate in the second PDCCH candidate set.

In this implementation, the method may further include S903: the terminal determines a reference PDCCH candidate according to a PDCCH monitored on a resource other than the overlapped resource.

The network device may send DCI through a PDCCH candidate on a non-overlapped resource in the first PDCCH candidate set, or send DCI through a PDCCH candidate on a non-overlapped resource in the second PDCCH candidate set. The terminal monitors all PDCCH candidates on resources other than the overlapped resource, and obtains, from the monitored PDCCHs, the DCI sent by the network device.

If the PDCCH actually monitored by the terminal is a PDCCH candidate in the first PDCCH candidate set, the terminal may determine a reference PDCCH candidate by using a pair of linked PDCCH candidates where the PDCCH candidate is located. If the PDCCH actually monitored by the terminal is a PDCCH candidate in the second PDCCH candidate set, the terminal may use the PDCCH candidate as a reference PDCCH candidate. For detailed descriptions of the reference PDCCH candidate, refer to related content in the foregoing embodiments. Details are not described herein again. Correspondingly, the network device may determine a reference PDCCH candidate based on the PDCCH candidate that actually carries DCI. An implementation is similar to that on the terminal side, and details are not described herein again.

Optionally, in another implementation, if the terminal determines that the resource corresponding to the first PDCCH candidate set overlaps resource corresponding to the second PDCCH candidate set, the terminal may not monitor the first PDCCH candidate set and the second PDCCH candidate set, to avoid a case in which a PDCCH is detected on an overlapped resource and whether the PDCCH is a repeatedly transmitted PDCCH or an independently transmitted PDCCH cannot be determined. In other words, S902 may be replaced with S902'. S902' includes: the terminal does not monitor the first PDCCH candidate set and the second PDCCH candidate set.

As shown in FIG. 10, an SS set #1 includes a PDCCH candidate used for independently transmitting DCI, an SS set #1 and an SS set #3 are mutually linked SS sets, an SS set #2 includes a PDCCH candidate used for independently transmitting DCI, and resources of the SS set #1 and resources of the SS set 2 fully overlap. Assuming that predefined UE does not monitor the linked SS sets, the terminal does not monitor the SS set #1 and the SS set #3, but monitors only the SS set #2. If the UE detects a PDCCH on an overlapped resource, the detected PDCCH is an independently transmitted PDCCH.

Figure 11:
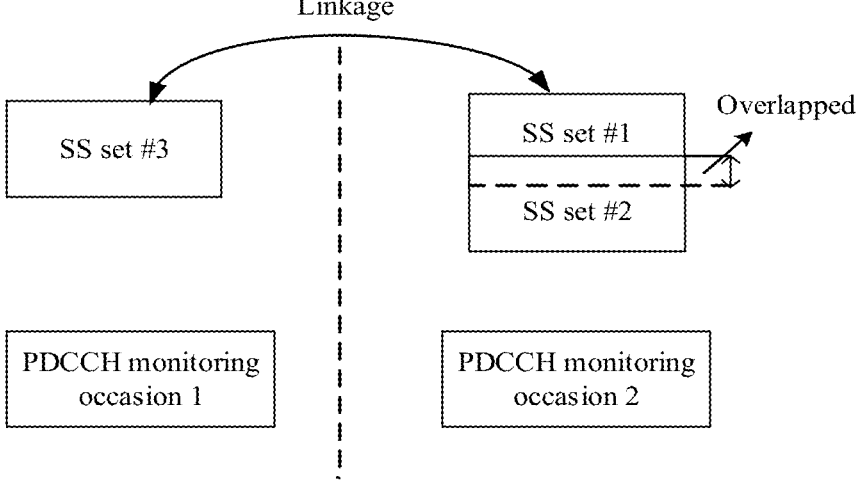
FIG. 11 is a schematic diagram of resource overlapping of a search space set according to an embodiment of this disclosure.

As shown in FIG. 11, an SS set #2 includes a PDCCH candidate used for individual DCI transmission, an SS set #1 and an SS set #3 are mutually linked SS sets, and resources of the SS set #1 and resources of the SS set 2 partially overlap. In this case, a terminal may not monitor PDCCH candidates on the overlapped resources, but normally monitor PDCCH candidates corresponding to other non-overlapped resources in the SS set #1 and the SS set #2.

According to the communication method provided in this disclosure, the terminal does not monitor a PDCCH candidate on an overlapped resource. This resolves a problem that the terminal cannot distinguish, on an overlapped resource, whether a monitored PDCCH is an independently transmitted PDCCH or a repeatedly transmitted PDCCH, so that a network device and the terminal have a consistent understanding of a manner of determining a reference point related to the PDCCH monitored on the overlapped resource, thereby improving communication reliability.

Figure 12:
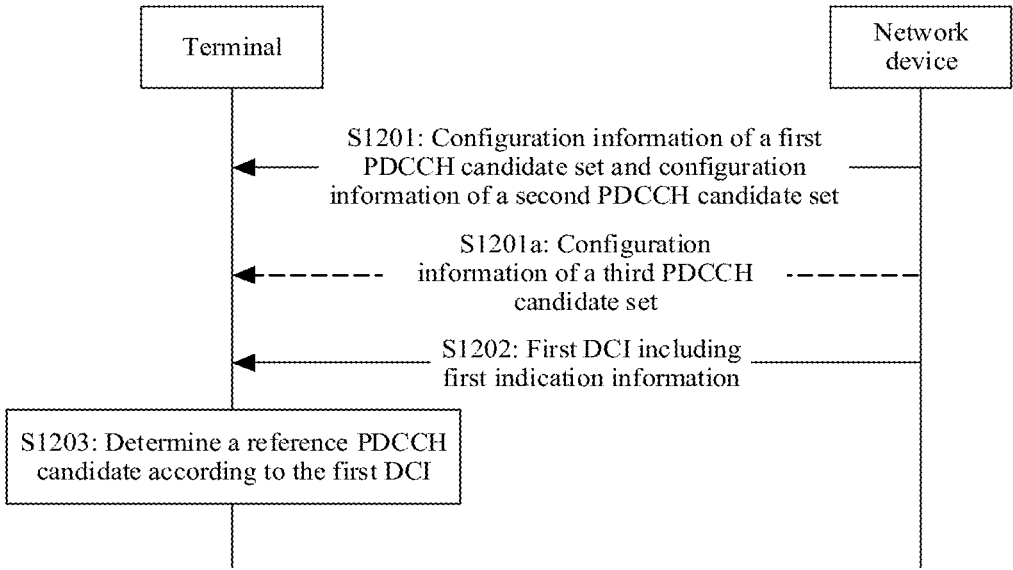
FIG. 12 is a schematic flowchart of another communication method according to an embodiment of this disclosure.

FIG. 12 is a schematic flowchart of a communication method according to an embodiment of this disclosure. As shown in FIG. 12, the method includes the following steps.

S1201: A terminal receives configuration information of a first PDCCH candidate set and configuration information of a second PDCCH candidate set from a network device.

S1202: The terminal receives first DCI from the network device, where the first DCI includes first indication information, the first indication information indicates that the first DCI is carried on a first PDCCH candidate in the first PDCCH candidate set or a second PDCCH candidate in the second PDCCH candidate set, the first PDCCH candidate and the second PDCCH candidate correspond to a same resource, the first PDCCH candidate belongs to a PDCCH candidate group, and the first PDCCH candidate and a third PDCCH candidate that is in the PDCCH candidate group are used to transmit same DCI, and the third PDCCH candidate belongs to the third PDCCH candidate set.

S1203: The terminal determines a reference PDCCH candidate according to the first DCI.

Optionally, the method further includes S1201a: the terminal receives configuration information of the third PDCCH candidate set from the network device.

For detailed descriptions of the first PDCCH candidate set, the second PDCCH candidate set, and the third PDCCH candidate set, refer to related content in the foregoing other embodiments. Details are not described herein again.

Optionally, one bit field is added to the first DCI, to determine whether the first DCI is carried on an independently sent PDCCH or carried on a repeatedly transmitted PDCCH. For example, the bit field is 1 bit. When the bit field is "0", it indicates that the first DCI is carried on an independently sent PDCCH. If the bit field is "1", it indicates that the first DCI is carried on a repeatedly transmitted PDCCH.

After determining, according to the first indication information, that the first DCI is carried on the first PDCCH candidate or the second PDCCH candidate, the terminal may determine a reference PDCCH candidate according to the PDCCH candidate group or an individual PDCCH. For detailed descriptions of the reference PDCCH candidate, refer to related content in another embodiment. Details are not described herein again. Correspondingly, the network device may determine a reference PDCCH candidate according to a PDCCH candidate that actually carries the first DCI. An implementation is similar to that on the terminal side. Details are not described herein again.

According to the communication method provided in this disclosure, DCI includes indication information to explicitly notify the terminal that a repeatedly transmitted PDCCH or an independently transmitted PDCCH is sent on an overlapped resource, so that the terminal and the network device have a consistent understanding of the PDCCH that is monitored on the overlapped resource, thereby improving communication reliability.

Figure 13:
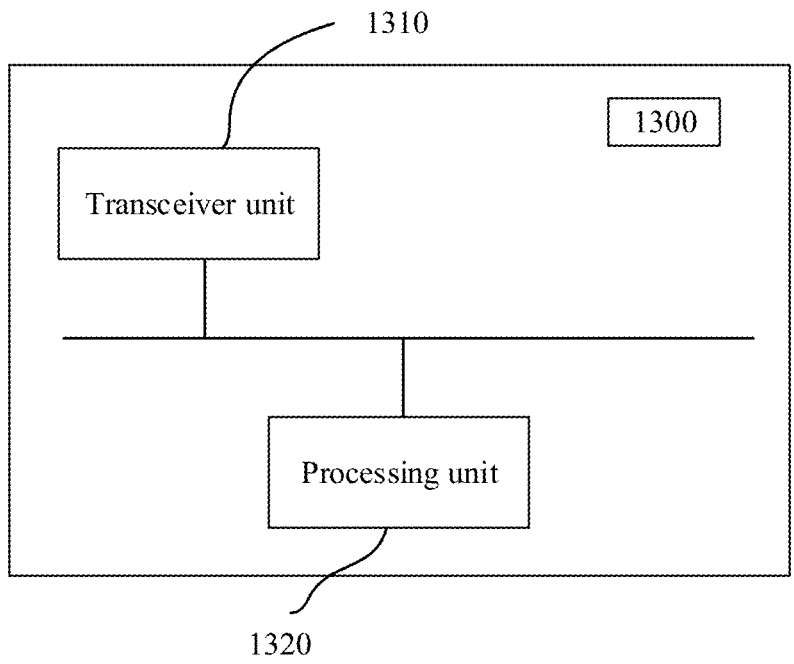
FIG. 13 is a schematic diagram of a structure of a communication apparatus according to an embodiment of this disclosure.

An embodiment of this disclosure further provides a communication apparatus to implement any one of the foregoing methods. For example, a communication apparatus is provided, including a unit (or a means) configured to implement steps performed by the terminal device or the network device in any one of the foregoing methods. For example, FIG. 13 is a schematic diagram of a communication apparatus according to an embodiment of this disclosure. The communication apparatus may be a module, for example, a chip, used for a terminal or a network device. Alternatively, the communication apparatus is a terminal or a network device. As shown in FIG. 13, the communication apparatus 1300 includes a transceiver unit 1310 and a processing unit 1320.

When the communication apparatus is used for a terminal, in an implementation, the transceiver unit 1310 may be configured to receive configuration information of a first PDCCH candidate set and configuration information of a second PDCCH candidate set. In addition, the transceiver unit 1310 may be configured to receive first DCI, and the first DCI is carried on a first PDCCH candidate in the first PDCCH candidate set or carried on a second PDCCH candidate in the second PDCCH candidate set, where the first PDCCH candidate and the second PDCCH candidate correspond to a same resource, the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set. The processing unit 1320 may be configured to: determine a reference PDCCH candidate according to the PDCCH candidate group, or use the second PDCCH candidate as a reference PDCCH, where a time domain location of the reference PDCCH candidate is used to determine a resource for uplink information transmission or downlink information transmission.

Optionally, in an implementation, the first PDCCH candidate and the second PDCCH candidate have a same scrambling code sequence, and carry DCI of a same payload size.

Optionally, in an implementation, the PDCCH candidate group includes one or more pairs of PDCCH candidates, each pair of PDCCH candidates is used to transmit same DCI, and the first PDCCH candidate and the third PDCCH candidate belong to a pair of PDCCH candidates.

Optionally, in an implementation, the processing unit 1320 is configured to: use the first PDCCH candidate as the reference PDCCH candidate, or use the third PDCCH candidate as the reference PDCCH candidate.

Optionally, in an implementation, the receiving unit 1310 is configured to: receive the first DCI according to the configuration information of the first PDCCH candidate set, or receive the first DCI according to the configuration information of the second PDCCH candidate set.

When the communication apparatus is used for a terminal, in an implementation, the transceiver unit 1310 is configured to receive configuration information of a first PDCCH candidate set and configuration information of a second PDCCH candidate set, where a resource corresponding to the first PDCCH candidate set overlaps a resource corresponding to the second PDCCH candidate set, the first PDCCH candidate set includes a first PDCCH candidate, the first PDCCH candidate belongs to a PDCCH candidate group, and the first PDCCH candidate and a third PDCCH candidate that is in the PDCCH candidate group are used to transmit same DCI; and the second PDCCH candidate set includes a second PDCCH candidate, the first PDCCH candidate and the second PDCCH candidate are located on the overlapped resources, and the third PDCCH candidate belongs to a third PDCCH candidate set. The processing unit 1320 is configured to monitor a PDCCH candidate on a resource that is in the first PDCCH candidate set and that does not overlap the resource of the second PDCCH candidate set, and monitor a PDCCH candidate on a resource that is in the second PDCCH candidate set and that does not overlap the resource of the first PDCCH candidate set.

Optionally, in an implementation, that a resource corresponding to the first PDCCH candidate set overlaps a resource corresponding to the second PDCCH candidate set includes: time domain resources corresponding to the first PDCCH candidate set and the second PDCCH candidate set fully overlap, and frequency domain resources corresponding to the first PDCCH candidate set and the second PDCCH candidate set partially overlap; or time domain resources corresponding to the first PDCCH candidate set and the second PDCCH candidate set partially overlap, and frequency domain resources corresponding to the first PDCCH candidate set and the second PDCCH candidate set partially overlap or fully overlap.

Optionally, in an implementation, the first PDCCH candidate set and the second PDCCH candidate set meet one or more of the following conditions: the first PDCCH candidate set and the second PDCCH candidate set correspond to DCI of a same payload size, the first PDCCH candidate set and the second PDCCH candidate set correspond to a same scrambling code, or the first PDCCH candidate set and the second PDCCH candidate set correspond to DCI of a same format.

Optionally, in an implementation, the first PDCCH candidate and the second PDCCH candidate correspond to a same resource, have a same scrambling code sequence, and carry a same payload size of downlink control information.

When the communication apparatus is used for a terminal, in an implementation, the receiving unit 1310 is configured to receive configuration information of a first PDCCH candidate set and configuration information of a second PDCCH candidate set, and receive first DCI, where the first DCI includes a first indicator, and the first indicator indicates that the first DCI is carried on a first PDCCH candidate in the first PDCCH candidate set or is carried on a second PDCCH candidate in the second PDCCH candidate set, the first PDCCH candidate and the second PDCCH candidate correspond to a same resource, the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set. The processing unit 1320 is configured to determine a reference PDCCH candidate based on the first DCI.

When the communication apparatus is used for a network device, in an implementation, the transceiver unit 1310 may be configured to send configuration information of a first PDCCH candidate set and configuration information of a second PDCCH candidate set, where the first PDCCH candidate set includes a first PDCCH candidate, the second PDCCH candidate set includes a second PDCCH candidate, the first PDCCH candidate and the second PDCCH candidate correspond to a same resource, and the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set. The transceiver unit 1310 is also configured to send first DCI, where the first DCI is carried on the first PDCCH candidate or carried on the second PDCCH candidate. The processing unit 1320 is configured to determine a reference PDCCH candidate according to the PDCCH candidate group, or use the second PDCCH candidate as a reference PDCCH, where a time domain location of the reference PDCCH candidate is used to determine a resource for uplink information transmission or downlink information transmission.

When the communication apparatus is used for a network device, in an implementation, the transceiver unit 1310 is configured to send configuration information of a first PDCCH candidate set and configuration information of a second PDCCH candidate set, where a resource corresponding to the first PDCCH candidate set overlaps a resource corresponding to the second PDCCH candidate set, the first PDCCH candidate set includes a first PDCCH candidate, the first PDCCH candidate belongs to a PDCCH candidate group, and the first PDCCH candidate and a third PDCCH candidate that is in the PDCCH candidate group are used to transmit same DCI; and the second PDCCH candidate set includes a second PDCCH candidate, the first PDCCH candidate and the second PDCCH candidate are located on the overlapped resources, and the third PDCCH candidate belongs to a third PDCCH candidate set. The transceiver unit 1320 is also configured to send first DCI, where the first DCI is carried on a PDCCH candidate on a resource that is in the first PDCCH candidate set and that does not overlap the resource of the second PDCCH candidate set, or the first DCI is carried on a PDCCH candidate on a resource that is in the second PDCCH candidate set and that does not overlap the resource of the first PDCCH candidate set.

When the communication apparatus is used for a network device, in an implementation, the transceiver unit 1310 is configured to send configuration information of a first PDCCH candidate set and configuration information of a second PDCCH candidate set. The transceiver unit 1310 is also configured to send first DCI, where the first DCI includes a first indicator, the first indicator indicates that the first DCI is carried on a first PDCCH candidate in the first PDCCH candidate set, or is carried on a second PDCCH candidate in the second PDCCH candidate set, the first PDCCH candidate and the second PDCCH candidate correspond to a same resource, the first PDCCH candidate belongs to a PDCCH candidate group, the first PDCCH candidate and a third PDCCH candidate that is in the PDCCH candidate group are used to transmit same DCI, and the third PDCCH candidate belongs to a third PDCCH candidate set. For the foregoing description of the communication apparatus on the network device side, refer to the description of the communication apparatus on the terminal side. For more detailed descriptions of the transceiver unit 1310 and the processing unit 1320, refer to related descriptions in the method embodiments shown in FIG. 5 to FIG. 12. Details are not described herein again.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an implementation of this disclosure, regarding hardware implementation, one or more processors may perform functions of the processing unit 1320, and a transceiver (a transmitter/a receiver) and/or a communication interface may perform functions of the transceiver unit 1310. The processing unit 1320 may be embedded in or independent of a processor of a network device/terminal in a hardware form, or may be stored in a memory of the network device/ terminal in a software form, so that the processor invokes and performs an operation corresponding to each of the foregoing functional unit.

In an implementation of this disclosure, a unit in any one of the foregoing communication apparatuses may be one or more integrated circuits configured to implement the foregoing methods, for example, one or more application-specific integrated circuits (ASIC), one or more microprocessors (e.g., digital signal processors (DSPs)), one or more field-programmable gate arrays (FPGA), or a combination of at least two of these forms of integrated circuits. For another example, when the unit in the apparatus may be implemented by scheduling a program by a processing element, the processing element may be a general-purpose processor, for example, a central processing unit (CPU) or another processor that can invoke the program. For still another example, the units may be integrated and implemented in a form of a system-on-a-chip (SOC). These integrated circuits may be integrated together to form a chip.

The foregoing unit (for example, the transceiver unit 1310) configured to receive and send information may be an interface circuit of a communication apparatus, and is configured to receive signals from another apparatus. For example, when the apparatus is implemented in a manner of a chip, the receiving unit is an interface circuit that is of the chip and that is configured to receive signals from another chip or apparatus. The foregoing unit used for sending (for example, the sending unit or the communication unit) is an interface circuit of the apparatus, and is configured to send signals to another apparatus. For example, when the apparatus is implemented in a manner of a chip, the sending unit is an interface circuit that is of the chip and that is configured to send signals to another chip or apparatus.

Figure 14:
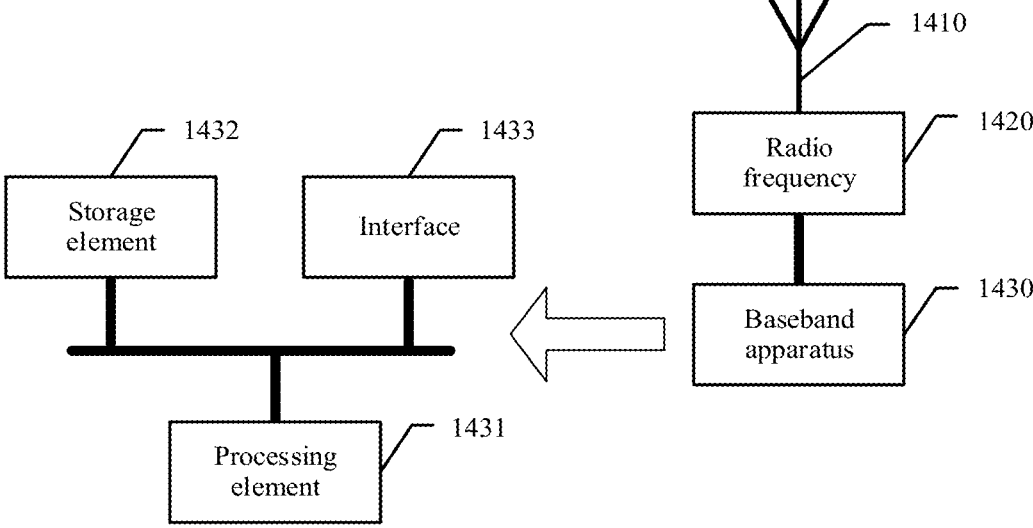
FIG. 14 is a schematic diagram of a structure of a network device according to an embodiment of this disclosure.

FIG. 14 is a schematic diagram of a structure of a network device according to an embodiment of this disclosure. The network device may be a base station, and is configured to perform the steps that are performed by the network device in the communication method provided in the foregoing method embodiment. As shown in FIG. 14, the network device includes an antenna 1410, a radio frequency apparatus 1420, and a baseband apparatus 1430. The antenna 1410 is connected to the radio frequency apparatus 1420. In an uplink direction, the radio frequency apparatus 1420 receives, by using the antenna 1410, information sent by the terminal, and sends, to the baseband apparatus 1430, the information sent by the terminal for processing. In a downlink direction, the baseband apparatus 1430 processes information about the terminal, and sends the information about the terminal to the radio frequency apparatus 1420. The radio frequency apparatus 1420 processes the information about the terminal, and then sends the processed information about the terminal to the terminal by using the antenna 1410.

The baseband apparatus 1430 may include one or more processing elements 1431, for example, a main control CPU and other integrated circuits. For another example, when the base station adopts a CU-DU architecture, a function of the baseband apparatus 1430 may be implemented by a CU and/or a DU. In addition, the baseband apparatus 1430 may further include a storage element 1432 and an interface 1433. The storage element 1432 is configured to store programs and data. The interface 1433 is configured to exchange information with the radio frequency apparatus 1420, and the interface is, for example, a common public radio interface (CPRI). The foregoing apparatus used for the network device may be located in the baseband apparatus 1430. For example, the foregoing apparatus used for the network device may be a chip in the baseband apparatus 1430. The chip includes at least one processing element and an interface circuit. The processing element is configured to perform steps that are performed by the network device in any communication method provided in the foregoing method embodiments, and the interface circuit is configured to communicate with another apparatus. In an implementation, units of the network device that implement the steps in the foregoing methods may be implemented in a form of processing element scheduling programs. For example, the apparatus used for the network device includes a processing element and a storage element. The processing element invokes a program stored in the storage element, to perform a communication method provided in the foregoing method embodiment. The storage element may be a storage element located on a same chip as the processing element, namely, an on-chip storage element; or may be a storage element that is located on a different chip from the processing element, namely, an off-chip storage element.

Figure 15:
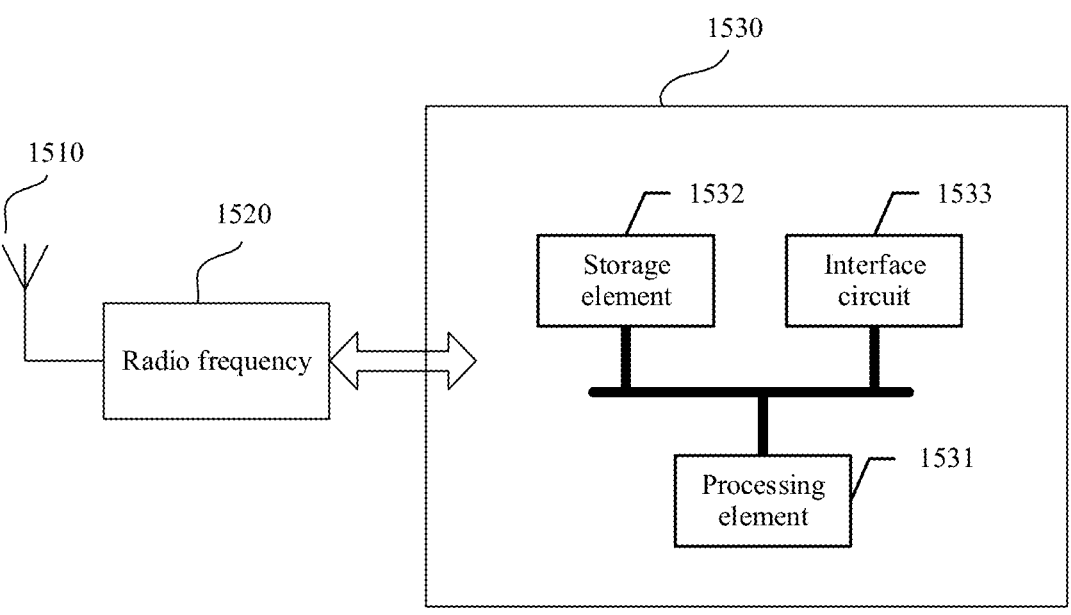
FIG. 15 is a schematic diagram of a structure of a terminal according to an embodiment of this disclosure.

FIG. 15 is a schematic diagram of a structure of a terminal according to an embodiment of this disclosure. The terminal is configured to implement steps performed by the terminal in the communication method provided in the foregoing method embodiment. As shown in FIG. 15, the terminal includes an antenna 1510, a radio frequency part 1520, and a signal processing part 1530. The antenna 1510 is connected to the radio frequency part 1520. In a downlink direction, the radio frequency part 1520 receives, through the antenna 1510, information sent by a network device, and sends, to the signal processing part 1530 for processing, the information sent by the network device. In an uplink direction, the signal processing part 1530 processes information of the terminal, and sends the information to the radio frequency part 1520. The radio frequency part 1520 processes the information of the terminal, and then sends the processed information to the network device by using the antenna 1510.

The signal processing part 1530 is configured to implement processing on each communication protocol layer of data. The signal processing part 1530 may be a subsystem of the terminal. The terminal may further include another subsystem, for example, a central processing subsystem, to process an operating system and an application layer of the terminal. For another example, the terminal may include a peripheral subsystem to connect to another device. The signal processing part 1530 may be a separately disposed chip. Optionally, the foregoing apparatus may be located in the signal processing part 1530.

The signal processing part 1530 may include one or more processing elements 1531, for example, including one main control CPU and other integrated circuits. In addition, the signal processing part 1530 may further include a storage element 1532 and an interface circuit 1533. The storage element 1532 is configured to store data and programs. The program used to perform the method performed by the terminal in the foregoing method may be stored in the storage element 1532, or may not be stored in the storage element 1532. For example, the program is stored in a memory outside the signal processing part 1530. When using the program, the signal processing part 1530 loads the program into a cache. The interface circuit 1533 is configured to communicate with an apparatus. The foregoing apparatus may be located in the signal processing part 1530. The signal processing part 1530 may be implemented by using a chip. The chip includes at least one processing element and an interface circuit. The processing element is configured to perform steps that are performed by the terminal in any communication method provided in the foregoing method embodiments. The interface circuit is configured to communicate with another apparatus. In an implementation, units that implement the steps in the foregoing methods may be implemented in a form of processing element scheduling programs. For example, the apparatus includes a processing element and a storage element. The processing element invokes a program stored in the storage element, to perform any communication method provided in the foregoing method embodiments. The storage element may be a storage element located on a same chip as the processing element, namely, an on-chip storage element.

In another implementation, the program used to perform the foregoing method performed by the terminal or the network device may be in a storage element that is located on a different chip from the processing element, that is, an off-chip storage element. In this case, the processing element invokes or loads the program from the off-chip storage element to the on-chip storage element, to invoke and perform any communication method in the foregoing method embodiments.

In still another implementation, the communication apparatus provided in this embodiment of this disclosure may include at least one processing element and an interface circuit, and the at least one processing element is configured to perform any communication method provided in the foregoing method embodiments. The processing element may perform a part or all of steps performed by the terminal device or the network device in a first manner, to be specific, by invoking a program stored in a storage element; or may perform a part or all of steps performed by the terminal device or the network device in a second manner, to be specific, by using a hardware integrated logic circuit in the processing element in combination with instructions; or may certainly perform, by combining the first manner and the second manner, a part or all of steps performed by the terminal device or the network device. It may be understood that the interface circuit may be a transceiver or an input/output interface. Optionally, the communication apparatus may further include a memory, configured to store instructions executed by the foregoing processing element, or store input data required by the processing element to run instructions, or store data generated after the processing element runs instructions.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

It may be understood that in the embodiments of this disclosure, the terminal device and/or the network device may perform some or all steps in the embodiments of this disclosure. These steps or operations are merely examples. In the embodiments of this disclosure, other operations or variations of various operations may be further performed. In addition, the steps may be performed in a sequence different from a sequence presented in embodiments of this disclosure, and not all the operations in embodiments of this disclosure may be performed.

What is claimed is:

1. A method, comprising:
sending first configuration information of a first physical downlink control channel (PDCCH) candidate set, second configuration information of a second PDCCH candidate set, and third configuration information of a third PDCCH candidate set to a terminal, wherein the first PDCCH candidate set comprises a first PDCCH candidate, wherein the second PDCCH candidate set comprises a second PDCCH candidate, wherein the third PDCCH candidate set comprises a third PDCCH candidate, wherein the first PDCCH candidate and the second PDCCH candidate correspond to a same first resource, wherein the first PDCCH candidate and the third PDCCH candidate are for transmitting same first downlink control information (DCI), and wherein the second PDCCH candidate is for independently transmitting second DCI;
determining, according to the first PDCCH candidate and the third PDCCH candidate, a reference PDCCH candidate, wherein the reference PDCCH candidate comprises a first time domain location;
determining, using the first time domain location, a second resource for uplink information transmission or downlink information transmission; and
sending, on either the first PDDCH candidate or the second PDCCH candidate and using the second resource, third DCI to the terminal.

2. The method of according to claim 1, wherein the first PDCCH candidate and the second PDCCH candidate have a same scrambling code sequence, carry fourth DCI of a same payload size, and correspond to a same control resource set (CORESET).

3. The method of according to claim 1, wherein sending the third DCI comprises:
sending, according to the first configuration information, the third DCI;
sending, according to the second configuration information, the third DCI; or
sending, according to the third configuration information, the third DCI.

4. The method of claim 1, wherein the first PDCCH candidate and the third PDCCH candidate belong to a pair of PDCCH candidates, and wherein the pair of PDCCH candidates is for transmitting same fourth DCI.

5. The method of claim 4, wherein determining the reference PDCCH candidate comprises:
using the first PDCCH candidate as the reference PDCCH candidate; or
using the third PDCCH candidate as the reference PDCCH candidate.

6. The method of claim 5, wherein when a second time domain location of the first PDCCH candidate is earlier than a third time domain location of the third PDCCH candidate and when the reference PDCCH candidate is used to determine a fourth time domain location of a physical downlink shared channel (PDSCH), the reference PDCCH candidate is the first PDCCH candidate.

7. The method of claim 5, wherein when a second time domain location of the first PDCCH candidate is earlier than a third time domain location of the third PDCCH candidate and when using the reference PDCCH candidate to determine a counter downlink assignment indicator (C-DAI) or a total downlink assignment indicator (T-DAI), the reference PDCCH candidate is the first PDCCH candidate.

8. An apparatus, comprising:
a memory configured to store instructions; and
one or more processors coupled to the memory and configured to execute the instructions to:
send first configuration information of a first physical downlink control channel (PDCCH) candidate set, second configuration information of a second PDCCH candidate set, and third configuration infor-
mation of a third PDCCH candidate set to a terminal,
wherein the first PDCCH candidate set comprises a
first PDCCH candidate, wherein the second PDCCH
candidate set comprises a second PDCCH candidate,
wherein the third PDCCH candidate set comprises a
third PDCCH candidate, wherein the first PDCCH
candidate and the second PDCCH candidate corre-
spond to a same first resource, wherein the first
PDCCH candidate and the third PDCCH candidate
are for transmitting same first downlink control
information (DCI), and wherein the second PDCCH
candidate is for independently transmitting second
DCI;

determine, according to the first PDCCH candidate and
the third PDCCH candidate, a reference PDCCH
candidate, wherein the reference PDCCH candidate
comprises a first time domain location;

determine, using the first time domain location, a
second resource for uplink information transmission
or downlink information transmission; and send, on either the first PDDCH candidate or the second
PDDCH candidate and using the second resource,
third DCI to the terminal.

9. The apparatus of claim 8, wherein the first PDCCH
candidate and the second PDCCH candidate have a same
scrambling code sequence, carry fourth DCI of a same
payload size, and correspond to a same control resource set
(CORESET).

10. The apparatus of claim 8, wherein the one or more
processors are further configured to execute the instructions
to:

send, according to the first configuration information, the
third DCI;

send, according to the second configuration information,
the third DCI; or send, according to the third configuration information, the
third DCI.

11. The apparatus of claim 8, wherein the first PDCCH
candidate and the third PDCCH candidate belong to a pair
of PDCCH candidates, and wherein the pair of PDCCH
candidates is for transmitting same fourth DCI.

12. The apparatus of claim 11, wherein the one or more
processors are further configured to execute the instructions
to:

use the first PDCCH candidate as the reference PDCCH
candidate; or use the third PDCCH candidate as the reference PDCCH
candidate.

13. The apparatus of claim 12, wherein when a second
time domain location of the first PDCCH candidate is earlier
than a third time domain location of the third PDCCH
candidate and when the reference PDCCH candidate is used
to determine a fourth time domain location of a physical
downlink shared channel (PDSCH), the reference PDCCH
candidate is the first PDCCH candidate.

14. The apparatus of claim 12, wherein when a second
time domain location of the first PDCCH candidate is earlier
than a third time domain location of the third PDCCH
candidate and when using the reference PDCCH candidate
is used to determine a counter downlink assignment indica-
tor (C-DAI) or a total downlink assignment indicator
(T-DAI), the reference PDCCH candidate is the first
PDCCH candidate.

15. An apparatus, comprising:

a memory configured to store instructions; and one or more processors coupled to the memory and
configured to execute the instructions to:

receive, from a network device, first configuration
information of a first physical downlink control
channel (PDCCH) candidate set, second configura-
tion information of a second PDCCH candidate set,
and third configuration information of a third
PDCCH candidate set;

receive, from the network device, first downlink control
information (DCI) on a first PDCCH candidate in the
first PDCCH candidate set or on a second PDCCH
candidate in the second PDCCH candidate set,
wherein the first PDCCH candidate and the second
PDCCH candidate correspond to a same first
resource, wherein the first PDCCH candidate and a
third PDCCH candidate are for transmitting the first
DCI, wherein the third PDCCH candidate belongs to
the third PDCCH candidate set, and wherein the
second PDCCH candidate is for independently trans-
mitting second DCI;

determine, according to the first PDCCH candidate and
the third PDCCH candidate, a reference PDCCH
candidate, wherein the reference PDCCH candidate
comprises a first time domain location; and determine, using the first time domain location, a
second resource for uplink information transmission
or downlink information transmission.

16. The apparatus of claim 15, wherein the first PDCCH
candidate and the second PDCCH candidate have a same
scrambling code sequence, carry third DCI of a same
payload size, and correspond to a same control resource set
(CORESET).

17. The apparatus of claim 15, wherein the one or more
processors are further configured to execute the instructions
to:

receive, according to the first configuration information,
the first DCI; information of the first PDCCH candidate
set;

receive, according to the second configuration informa-
tion, the first DCI; or receive, according to the third configuration information,
the first DCI.

18. The apparatus of claim 15, wherein the first PDCCH
candidate and the third PDCCH candidate belong to a pair
of PDCCH candidates for transmitting a same third DCI.

19. The apparatus of claim 18, wherein the one or more
processors are further configured to execute the instructions
to:

use the first PDCCH candidate as the reference PDCCH
candidate; or use the third PDCCH candidate as the reference PDCCH
candidate.

20. The apparatus of claim 19, wherein when a second
time domain location of the first PDCCH candidate is earlier
than a third time domain location of the third PDCCH
candidate and when the reference PDCCH candidate is used
to determine a fourth time domain location of a physical
downlink shared channel (PDSCH), the reference PDCCH
candidate is the third PDCCH candidate.

* * * * *